US010512359B2

(12) United States Patent
Xu et al.

(10) Patent No.: US 10,512,359 B2
(45) Date of Patent: Dec. 24, 2019

(54) PROGRAMMABLE CONTROLLED INTELLIGENT COOKING MACHINE

(71) Applicants: Jinbiao Xu, Guangdong (CN); Guang He, Guangdong (CN)

(72) Inventors: Jinbiao Xu, Guangdong (CN); Guang He, Guangdong (CN)

(*) Notice: Subject to any disclaimer, the term of this patent is extended or adjusted under 35 U.S.C. 154(b) by 526 days.

(21) Appl. No.: 14/770,831

(22) PCT Filed: Mar. 7, 2013

(86) PCT No.: PCT/CN2013/072290
§ 371 (c)(1),
(2) Date: Dec. 4, 2015

(87) PCT Pub. No.: WO2014/131205
PCT Pub. Date: Sep. 4, 2014

(65) Prior Publication Data
US 2016/0106259 A1    Apr. 21, 2016

(30) Foreign Application Priority Data
Feb. 28, 2013    (CN) .......................... 2013 1 0064095

(51) Int. Cl.
*A47J 36/00*    (2006.01)
*G05B 19/042*    (2006.01)
(Continued)

(52) U.S. Cl.
CPC .......... *A47J 36/00* (2013.01); *G05B 19/0426* (2013.01); *G07F 9/105* (2013.01); *G07F 17/0078* (2013.01); *H05B 6/129* (2013.01)

(58) Field of Classification Search
CPC ........ A47J 36/00; G05B 19/0426; G07F 9/00; H05B 6/129
See application file for complete search history.

(56) References Cited

U.S. PATENT DOCUMENTS 4,503,502 A * 3/1985 Chapin .................. A47J 27/62
700/90
4,700,617 A * 10/1987 Lee .......................... A47J 27/14
134/115 R
(Continued)

FOREIGN PATENT DOCUMENTS

CN        1545020 A     11/2004
CN      101006833 A      8/2007
(Continued)

OTHER PUBLICATIONS

International Search Report of PCT Patent Application No. PCT/CN2013/072290 dated Dec. 12, 2013.
(Continued)

*Primary Examiner* — Kenneth M Lo
*Assistant Examiner* — Mohammad A Rahman
(74) *Attorney, Agent, or Firm* — Shimokaji IP

(57) ABSTRACT

A programmable controlled intelligent cooking machine comprises: a housing and a wok arranged inside of the housing, electromagnetic heating coils, a wok rotating device, a wok working position controlling device, a wok lid and a wok lid controlling device, an electromagnetic heating controlling device, an ingredient feeding device, an accessory ingredient adding device, a dish discharging device, a wok washing device and a control device, wherein the electromagnetic heating coils wind around the external wall of the wok and heat the wok under the control of the electromagnetic heating controlling device; the wok working position controlling device is used for driving the wok to rotate to respective working positions to perform respective operations; the electrical control device is used for receiving preset recipe commands and sending corresponding control commands; the other devices are connected with the control device respectively so as to receive control commands.

9 Claims, 17 Drawing Sheets

(51) Int. Cl.
H05B 6/12 (2006.01)
G07F 9/10 (2006.01)
G07F 17/00 (2006.01)

(56) References Cited

U.S. PATENT DOCUMENTS

| | | | | |
|---|---|---|---|---|
| 4,919,950 | A * | 4/1990 | Mak | A47J 27/14 |
| | | | | 426/233 |
| 5,402,712 | A * | 4/1995 | King | A47J 27/0817 |
| | | | | 99/404 |
| 6,009,795 | A * | 1/2000 | Werts | A47J 27/0817 |
| | | | | 220/314 |
| 6,843,166 | B1 * | 1/2005 | Li | A47J 27/14 |
| | | | | 99/327 |
| 7,589,301 | B2 * | 9/2009 | Seok | H05B 6/062 |
| | | | | 219/624 |
| 2008/0257168 | A1 * | 10/2008 | Wolfe | A47J 36/165 |
| | | | | 99/348 |

FOREIGN PATENT DOCUMENTS

| | | |
|---|---|---|
| CN | 101522079 A | 9/2009 |
| CN | 101874706 A | 11/2010 |

OTHER PUBLICATIONS

1st Office Action of counterpart Chinese Patent Application No. 201310064095.9 dated Aug. 15, 2014.
2nd Office Action of counterpart Chinese Patent Application No. 201310064095.9 dated Mar. 30, 2015.

\* cited by examiner

PROGRAMMABLE CONTROLLED INTELLIGENT COOKING MACHINE

FIELD OF THE INVENTION

The present invention relates to the technical field of intelligent household electrical appliance, more particularly to a programmable controlled intelligent cooking machine.

BACKGROUND OF THE INVENTION

Chinese culinary art is extensive and profound and has a variety of cooking techniques, which mainly comprise: stir frying, stewing, deep frying, boiling, steaming, pan frying, grilling, etc. The essence of various cooking techniques is to cook ever-changing dishes with various tastes and flavors by changing food match and controlling heating. Up to now, cooking process involves a lot of manual labor and relies very much on the cooker's experience and skills.

There exists some automated cooking machines, however, they normally cannot realize fully-automatic operation from feeding raw ingredients into the wok till pouring the cooked food out of the wok. More particularly, existing automated cooking machines cannot automatically pour the cooked food out of the wok or put accessory ingredients and raw food easily, and thus manual operation is still required during the cooking process. In addition, existing automatic operation program only has single function to cook dishes with same flavor and cannot be popular used.

SUMMARY OF THE INVENTION

The present invention aims to provide a programmable controlled intelligent cooking machine, which is capable of running recipe program programmed with various general recipe commands, and interpreting and executing the recipe program in sequence according to the commands. It has good compatibility and may realize full automatic cooking with minimum manual intervention.

In order to achieve the above goal, the present invention provides a programmable controlled intelligent cooking machine, comprising: a housing and a wok arranged inside of the housing, electromagnetic heating coils, a wok rotating device, a wok working position controlling device, a wok lid and a wok lid controlling device, an electromagnetic heating controlling device, an automatic ingredient feeding device, an automatic accessory ingredient adding device, an automatic dish discharging device, an automatic wok washing device and an electrical control device, wherein the electromagnetic heating coils wind around the external wall of the wok and heat the wok under the control of the electromagnetic heating controlling device; the wok rotating device is connected with the wok so as to control the wok to rotate; the wok working position controlling device is used for securing the wok and controlling the wok to rotate, so as to drive the wok to rotate to respective working positions to perform respective operations; the electrical control device is used for receiving preset recipe commands and sending corresponding control commands according to the recipe commands; the wok rotating device, the wok working position controlling device, the wok lid controlling device, the electromagnetic heating controlling device, the automatic ingredient feeding device, the automatic accessory ingredient adding device, the automatic dish discharging device and the automatic wok washing device are connected with the electrical control device respectively, and perform respective operations according to the received control commands, thereby realizing full-automatic cooking.

Preferably, the automatic ingredient feeding device is arranged right above the wok. It comprises an ingredient feeding sub-controlling system, an ingredient receiving and releasing component and an ingredient feeding guide groove, wherein the ingredient feeding sub-controlling system is connected with the electrical control device so as to receive major ingredient feeding control command, the ingredient receiving and releasing component is used for receiving standard packaged ingredient and releasing the received ingredient to the wok along the ingredient feeding guide groove under the control of the ingredient feeding sub-controlling system.

Preferably, the electromagnetic heating controlling device comprises an electromagnetic sub-controlling system, a wok temperature detector and a high frequency driving source, wherein the high frequency driving source is connected with the electromagnetic heating coils, the electromagnetic sub-controlling system is connected with the electrical control device, so as to receive heating control command and control the intensity of the high frequency driving source according to the data detected by the wok temperature detector.

Preferably, the wok lid controlling device comprises a wok lid sub-controlling system, a wok lid push-pull component fixedly connected with the wok lid, wherein the wok lid sub-controlling system is connected with the electrical control device, so as to receive the control commands of opening or closing the wok lid and control the wok lid push-pull component to pull or push the wok lid, thereby realizing the opening and closing of the wok lid.

Preferably, the automatic accessory ingredient adding device comprises an ingredient adding sub-controlling system, an accessory ingredient pumping component and an accessory ingredient conduction pipe, wherein the ingredient adding sub-controlling system is connected with the electrical control device so as to receive the control commands of adding accessory ingredients, the wok lid is provided with an opening for connecting the accessory ingredient conduction pipe, the accessory ingredient pumping component is connected with a plurality of accessory ingredient storage devices which store various liquid accessory ingredients, and pumps out an appropriate amount of the corresponding accessory ingredient and adds it into the wok via the accessory ingredient conduction pipe under the control of the ingredient adding sub-controlling system.

Preferably, the wok rotating device comprises a rotating sub-controlling system, a motor and a rotating shaft, wherein the rotating sub-controlling system is connected with the electrical control device so as to receive rotating control commands, the rotating shaft is fixedly connected with the wok, the motor drives the rotating shaft to rotate under the control of the rotating sub-controlling system and thereby drives the wok to rotate.

Preferably, the wok working position controlling device comprises a working position sub-controlling system, a motor, a main shaft and a wok frame, wherein the wok frame is used for securing the wok and is hold in the housing by the main shaft, the working position sub-controlling system is connected with the electrical control device, so as to receive various control commands, drive the main shaft to rotate on the basis of various control commands and thereby drive the wok to rotate to respective working positions to perform respective operations.

Preferably, the automatic wok washing device comprises a wok washing sub-controlling system, a water infusing component, a wok brush stretching and retracting component, a rotatable wok washing component and a waste water draining component, wherein the wok washing sub-controlling system is connected with the electrical control device so as to receive wok washing control command and control the water infusing component, the wok brush stretching and retracting component, the rotatable wok washing component and the waste water draining component to perform wok washing operation. Meanwhile, the wok rotating device controls the wok to rotate and performs wok washing operation when receiving wok washing control command. After the wok is washed, the wok brush will be retracted back.

Preferably, the dish discharging device comprises a dish discharging sub-controlling system, a tray, a tray conveying component and a dish discharging component, wherein the tray is used for carrying the dish plate, the dish discharging sub-controlling system is connected with the electrical control device, so as to receive dish discharging control command and control the tray conveying component to convey the tray together with the dish plate to a best position for dish discharging or dish taking and the dish discharging component to work, thereby realizing the dish discharging operation.

Preferably, it comprises a human-computer interface connected with the electrical control device and/or comprises a network interface. Users may directly input recipe commands via the human-computer interface, or directly call the recipe program stored in the cooking machine, and/or input recipe programs via the network interface.

The programmable controlled intelligent cooking machine provided by the present invention has advantages as follows:

1. Maximum compatibility. It is capable of running the recipe program programmed with all complex general recipe commands (e.g. vmmda1.0), interpreting and executing the recipe program according to the command sequence, so as to perform various cooking operations and cook dishes with various flavors according to various recipe programs.

2. Minimum manual intervention (Except that the standard packaged ingredient is manually placed into the ingredient chamber opening of the cooking machine, all the rest operations are performed by the machine). It may realize functions such as automatically feeding major ingredient, automatically adding accessory ingredient, automatically discharging dish, automatically washing wok and so on, whereby realizing full-automatic cooking.

3. It may accept the recipe program programmed with general recipe commands in many ways. Users may program recipe programs by themselves, or directly call a large number of recipe programs of Chinese dishes stored in the machine, or input external recipe programs via the network.

4. Generality. It supports general recipe commands so the recipe program may be shared; it supports four-compartment standard package so the major ingredient of Chinese dish may be standardized produced/stocked/transported/sold; it supports standard liquid package for accessory ingredients (condiment and seasoning) so the accessory ingredients may be standardized produced/stocked/transported/sold.

DETAILED DESCRIPTION OF ILLUSTRATED EMBODIMENTS

The technical solutions of the embodiments according to the present invention are clearly and fully described as below with reference to the accompanying drawings in the embodiments of the present invention. Apparently, the embodiments to be described are merely a part rather than all of the embodiments of the present invention. All other embodiments obtained by persons with ordinary skills in the art based on the embodiments of the present invention without creative efforts shall fall within the protection scope of the present invention.

Figure 1:
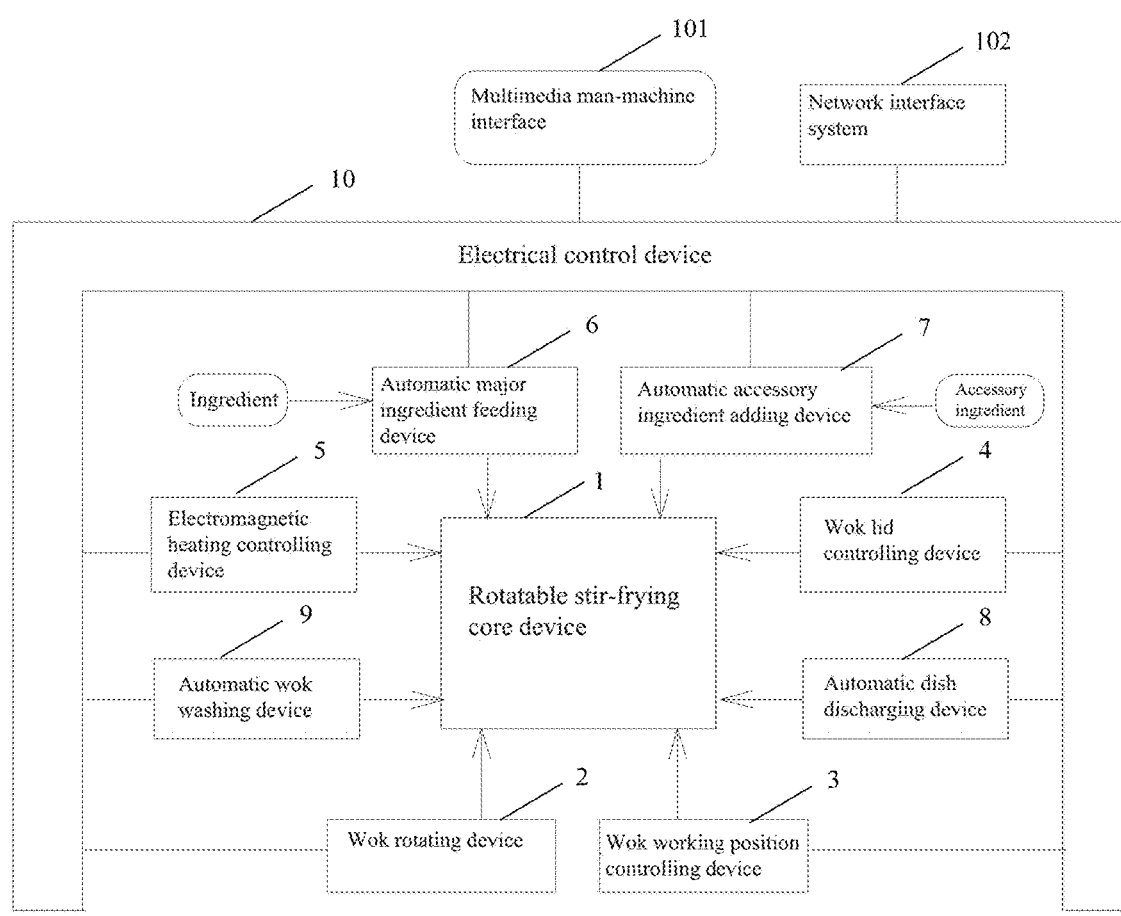
FIG. 1 is a system composition block diagram of a programmable controlled intelligent cooking machine according to an embodiment of the present invention.

Referring to FIG. 1, it is a system composition block diagram of a programmable controlled intelligent cooking machine according to an embodiment of the present invention. The entire system comprises: a rotatable stir-frying core device 1 consisting of a wok and electromagnetic heating coils, a wok rotating device 2, a wok working position controlling device 3, a wok lid controlling device 4, an electromagnetic heating controlling device 5, an automatic ingredient feeding device 6, an automatic accessory ingredient adding device 7, an automatic dish discharging device 8, an automatic wok washing device 9 and an electrical control device 10, wherein the electrical control device 10 is used for receiving a preset recipe program and sending an according control command on the basis of the recipe program, the wok rotating device 2, the wok working position controlling device 3, the wok lid controlling device 4, the electromagnetic heating controlling device 5, the automatic ingredient feeding device 6, the automatic accessory ingredient adding device 7, the automatic dish discharging device 8 and the automatic wok washing device 9 are connected to the electrical control device 10 respectively, and perform respective operations according to the received control commands, thereby realizing full-automatic cooking. In the present embodiment, the system also comprises a multimedia man-machine interface 101 connected with the electrical control device and a network interface 102. Users may program recipe programs by themselves by the multimedia man-machine interface 101, or directly call a large number of recipe programs of Chinese dishes stored in the machine, or input external general recipe programs via the network interface 102.

Figure 2:
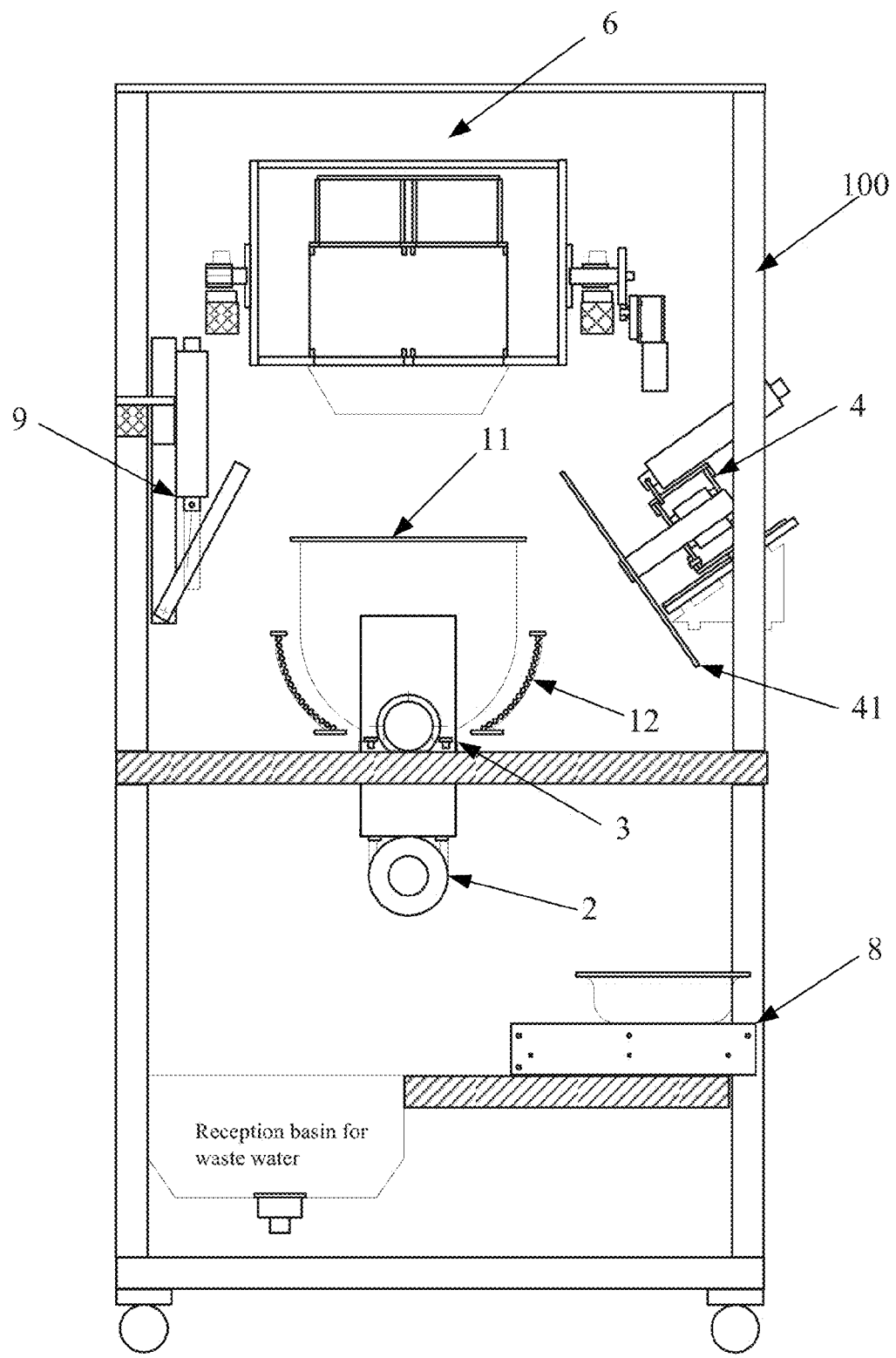
FIG. 2 is a structure diagram of a programmable controlled intelligent cooking machine according to an embodiment of the present invention.
Figure 3:
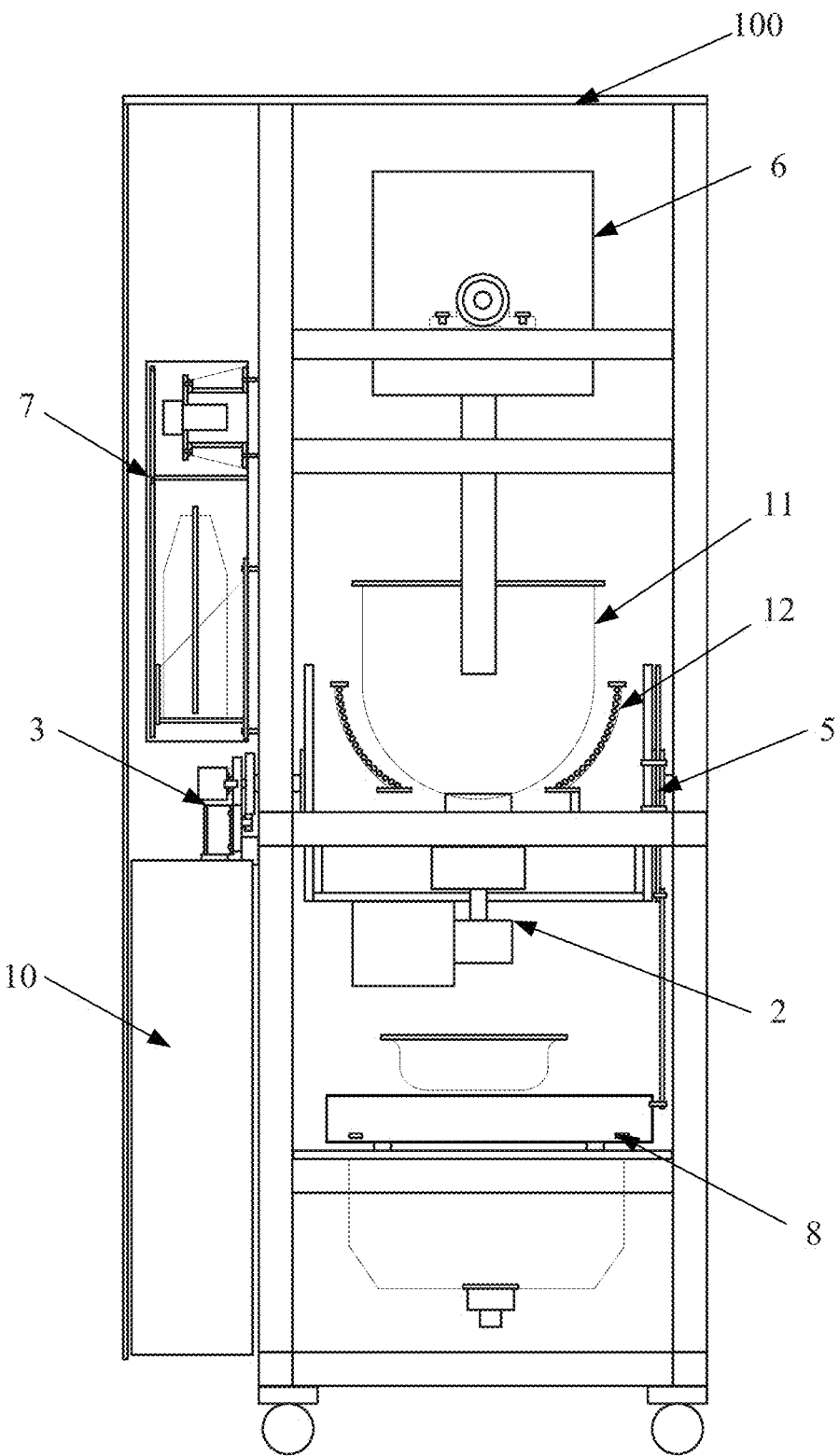
FIG. 3 is another structure diagram of the programmable controlled intelligent cooking machine shown in FIG. 2.

Referring to FIG. 2 and FIG. 3, the structure of the programmable controlled intelligent cooking machine according to the present invention is described in detail as below. Thereinto, it can be understood that FIG. 2 and FIG. 3 are structure diagrams of same embodiment, only different in viewing angle. The programmable controlled intelligent cooking machine comprises a housing 100, a wok 11 accommodated inside of the housing 100, electromagnetic heating coils 12, a wok rotating device 2, a wok working position controlling device 3, a wok lid 41 and a wok lid controlling device 4, an electromagnetic heating controlling device 5, an automatic ingredient feeding device 6, an automatic accessory ingredient adding device 7, an automatic dish discharging device 8, an automatic wok washing device 9 and an electrical control device 10.

Thereinto, the wok 11 is positioned centrally in the interior of the housing 100. The cylinder body of the wok 11 comprises a hollow cylinder-shaped upper part and a hemisphere-shaped lower part. Furthermore, a plurality of stirring pieces (not shown in figures) are arranged on the internal wall of the lower part of the wok 11 so as to achieve stir frying effects like tossing the pan when the wok 11 rotates and cooks. The wok 11 is a stainless iron wok with the entire internal wall coated with a non-stick material layer having excellent heat resistance. The electromagnetic heating coils 12 wind around the external wall of the lower part of the wok 11 into a hemisphere shape and heat the wok 11 under the control of the electromagnetic heating controlling device 5. Due to the electromagnetic heating, a three-dimensional surround hemisphere heating temperature field which heats quickly and has high thermal efficiency is formed in the wok 11. The formed heating temperature field has a similar effect as traditional blowing-type cook-stoves heating wok, it greatly meets the requirement of heating control in Chinese culinary art and is energy-efficient.

Figure 4:
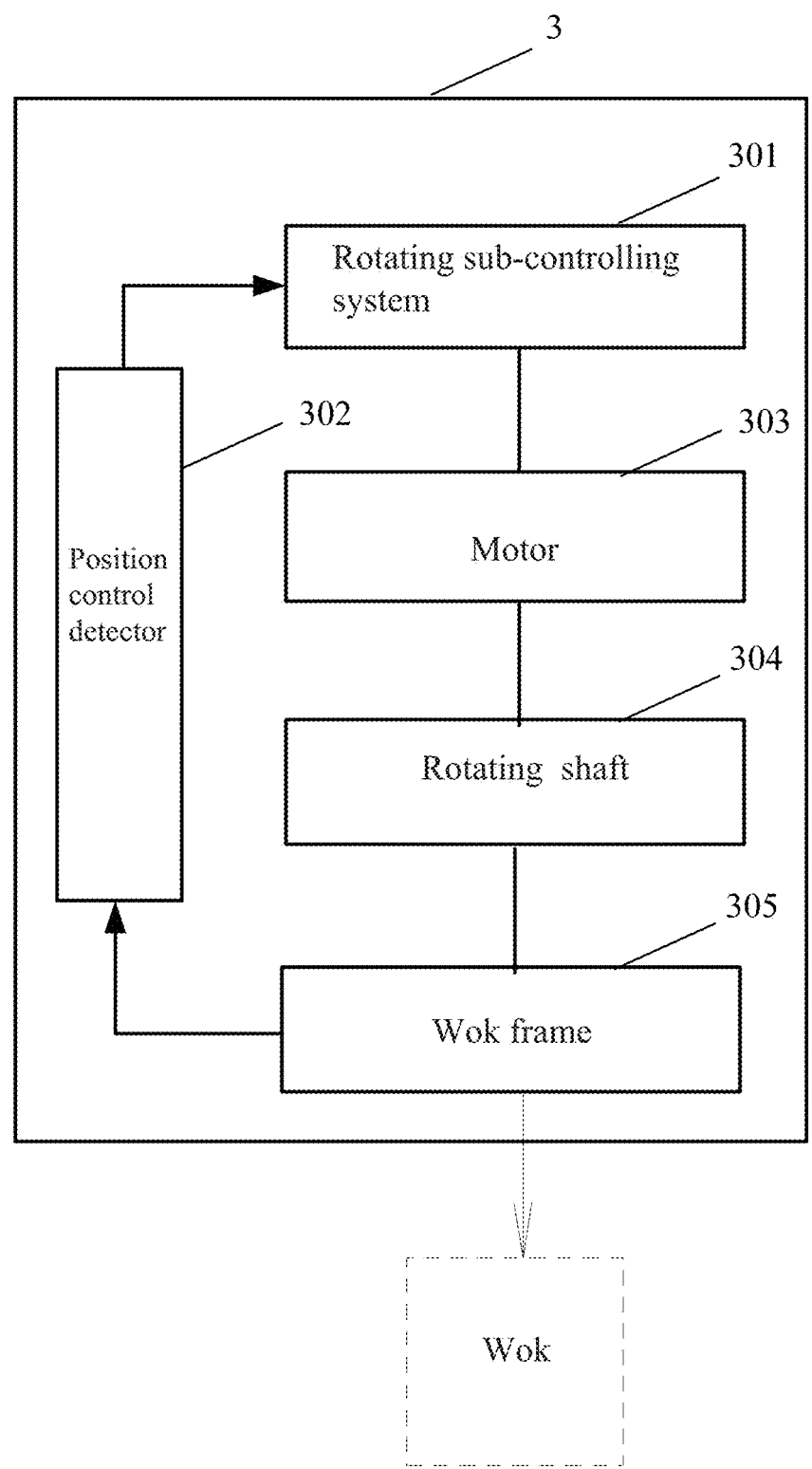
FIG. 4 is a composition block diagram of a wok working position controlling device of the programmable controlled intelligent cooking machine shown in FIG. 1.

Referring to FIG. 4, the wok working position controlling device 3 comprises a working position sub-controlling system 301, a position controlling detector 302, a motor 303, a main shaft 304 and a wok frame 305 which is used for securing the wok 11 and is hold in the housing 100 by the main shaft 304, wherein the main shaft 304 is connected at one end to the motor 303 and thus rotates under the control of the motor 303, thereby driving the wok frame 305 and the wok 11 to rotate and realizing 360-degree rotation. The motor 303 is electrically connected with the working position sub-controlling system 301 and works under the control of the working position sub-controlling system 301. The position controlling detector 302 is used for detecting the rotate angle of the wok frame 305 and the wok 11 so as to make sure they do rotate to the precise working position, and for sending the detected data to the working position sub-controlling system 301. The working position sub-controlling system 301 is connected with the electrical control device 10 to receive various control commands and send control commands to the motor 303 on the basis of the various control commands and the detected data received from the position controlling detector 302, so as to drive the main shaft 304 to rotate and make the wok frame 305 and the wok 11 rotate to corresponding working positions to perform corresponding operations. All operations, except for dish discharging operation, will be performed only after the wok 11 has rotated to corresponding working positions.

In the present embodiment, five working positions are provided, i.e. a major ingredient feeding working position, an accessory ingredient adding (cooking) working position, a dish discharging working position, a wok washing working position and a waste water draining working position. The wok frame 305 is capable of driving the wok 11 to rotate to each working position, and making the wok 11 face towards each corresponding device so as to perform corresponding automatic cooking operations such as ingredient feeding, cooking (accessory ingredient adding), dish discharging, wok washing, waste water draining, etc. For example, when the working position sub-controlling system 301 receives an accessory ingredient adding command or a rotating control command, the wok 11 is rotated to an accessory ingredient adding (cooking) working position (which is preferably a position with a 45-degree angle to the original position) in a clockwise direction, so as to make the wok face towards the wok lid 41 and the wok lid controlling device 4; when the working position sub-controlling system 301 receives a major ingredient feeding control command, the wok 11 is rotated to an ingredient feeding working position (which is vertical position, namely, the original position), so as to make the wok face towards the automatic ingredient feeding device 6; when the working position sub-controlling system 301 receives a dish discharging control command, the wok 11 is rotated to a dish discharging working position (which is preferably a position with a 135-degree angle to the original position) in a clockwise direction, so as to make the wok face towards the automatic dish discharging device 8; when the working position sub-controlling system 301 receives a wok washing control command, the wok 11 is rotated to a wok washing working position (which is preferably a position with a 45-degree angle to the original position) in an anti-clockwise direction, so as to make the wok face towards the automatic wok washing device 9, and when receiving a waste water draining control command after the wok washing is finished, the wok is further rotated to a waste water draining working position (which is preferably a position with a 135-degree angle to the original position) in an anti-clockwise direction, so as to make the wok face towards a reception basin.

Figure 5:
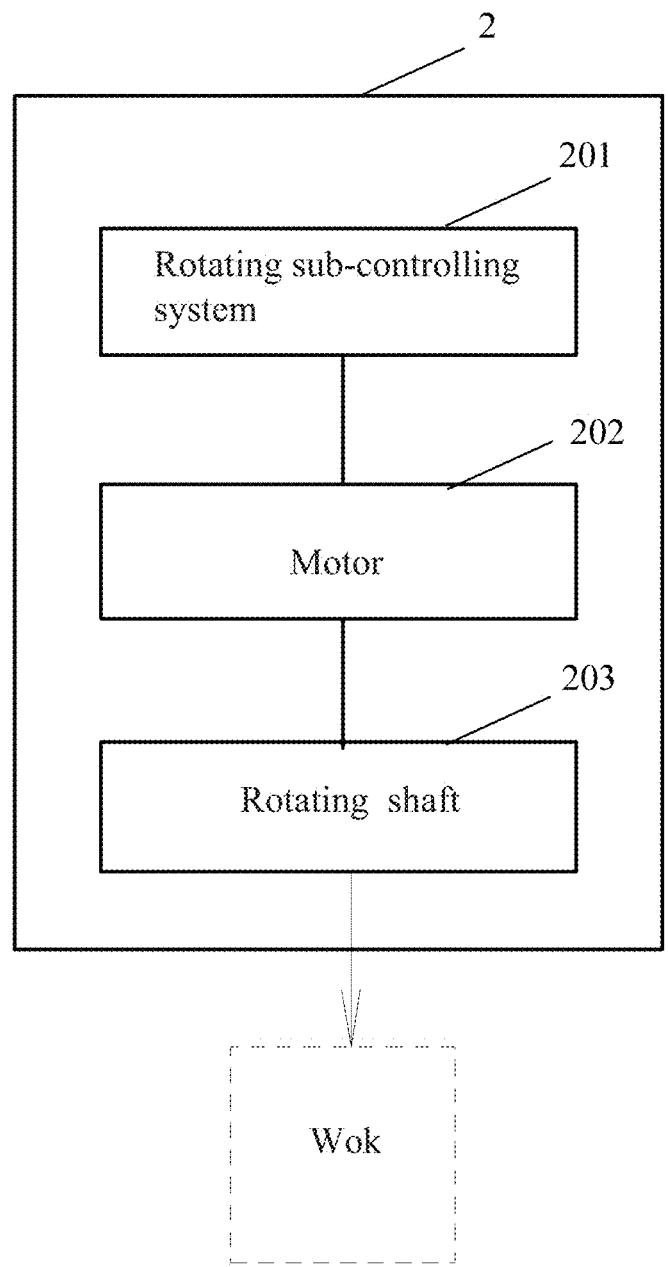
FIG. 5 is a composition block diagram of a wok rotating device of the programmable controlled intelligent cooking machine shown in FIG. 1.

Referring to FIG. 5, the wok rotating device 2 comprises a rotating sub-controlling system 201, a motor 202 and a rotating shaft 203, wherein the rotating shaft 203 is fixedly connected at one end to the lower part of the wok 11 and is connected at another end to the motor 202, the rotating shaft 203 is rotated under the control of the motor 202, thereby driving the wok 11 to rotate and realizing 360-degree rotation. The motor 203 is electrically connected with the rotating sub-controlling system 20 and works under the control of the rotating sub-controlling system 20. The rotating sub-controlling system 201 is connected to the electrical control device 10 so as to receive rotating control commands and send control signals on the basis of the control commands, thereby making the wok 11 perform various rotation motions and controlling the rotation direction and speed of the wok 11. The stir-frying function of the present embodiment realizes various stir frying effects in the way of rotation motions combination control, which is similar to a roller rotating and stiffing. Various effects like saute-stirring and stir-frying can be realized by combining various rotation modes including high-speed rotation, low-speed rotation, clockwise rotation and anti-clockwise rotation. By cooperatively using stirring pieces arranged in the wok 11 and controlling the rotating angle of the wok 11, the stir frying effect like tossing the pan can be realized.

Figure 6:
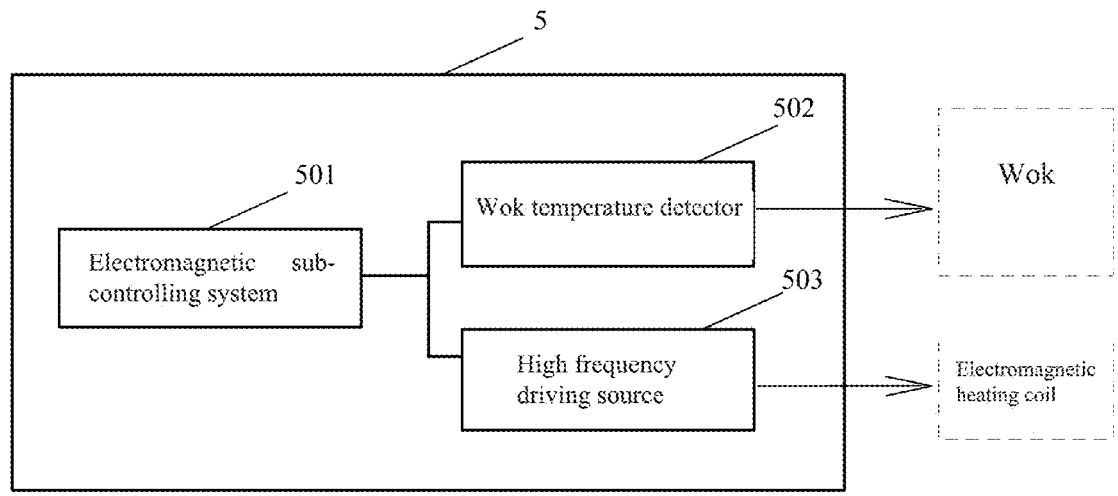
FIG. 6 is a composition block diagram of an electromagnetic heating controlling device of the programmable controlled intelligent cooking machine shown in FIG. 1.

Referring to FIG. 6, the electromagnetic heating controlling device 5 comprises an electromagnetic sub-controlling system 501, a wok temperature detector 502 and a high frequency driving source 503, the wok temperature detector 502 is used for detecting the temperature of the wok body and sending the detected data to the electromagnetic sub-controlling system 501. The high frequency driving source 503 is connected to the electromagnetic heating coils 12 so as to generate current for the electromagnetic heating coils 12. The electromagnetic sub-controlling system 501 is connected to the electrical control device 11 so as to receive turn-on, turn-off and heating control commands, control it to open, close, turn-on or turn down the high frequency driving source 503 on the basis of the detected data of the wok temperature detector 502, so that heating time and current intensity of the electromagnetic heating coils 12 can be controlled and thus heating time and heating temperature for the wok 11 can be controlled. In the present embodiment, the function of precise heating control required by Chinese culinary art is realized by controlling heating temperature and heating time. The heating temperature is controlled by adjusting the current intensity of the electromagnetic heating coils 12 and making the wok temperature stable in the range of controlling value. Since the electromagnetic heating does not have time-lag, heating control performed in this way is much more sensitive than that performed in other ways such as traditional open fires and resistance generating and conducting. When further cooperatively employing precise control of heating time, the function of heating control required by Chinese culinary art can be fully realized. It can be understood that, the electromagnetic heating controlling device 5 of the present embodiment may be fixedly mounted on the wok frame 305.

Figure 7:
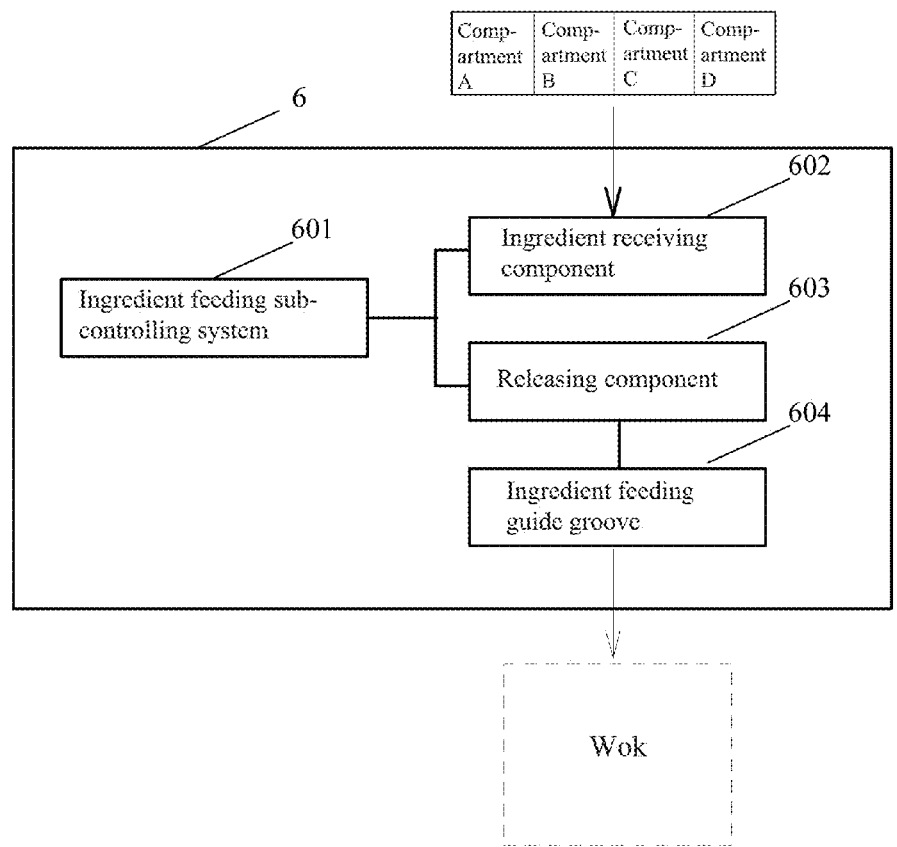
FIG. 7 is a composition block diagram of an automatic ingredient feeding device of the programmable controlled intelligent cooking machine shown in FIG. 1.
Figure 8:
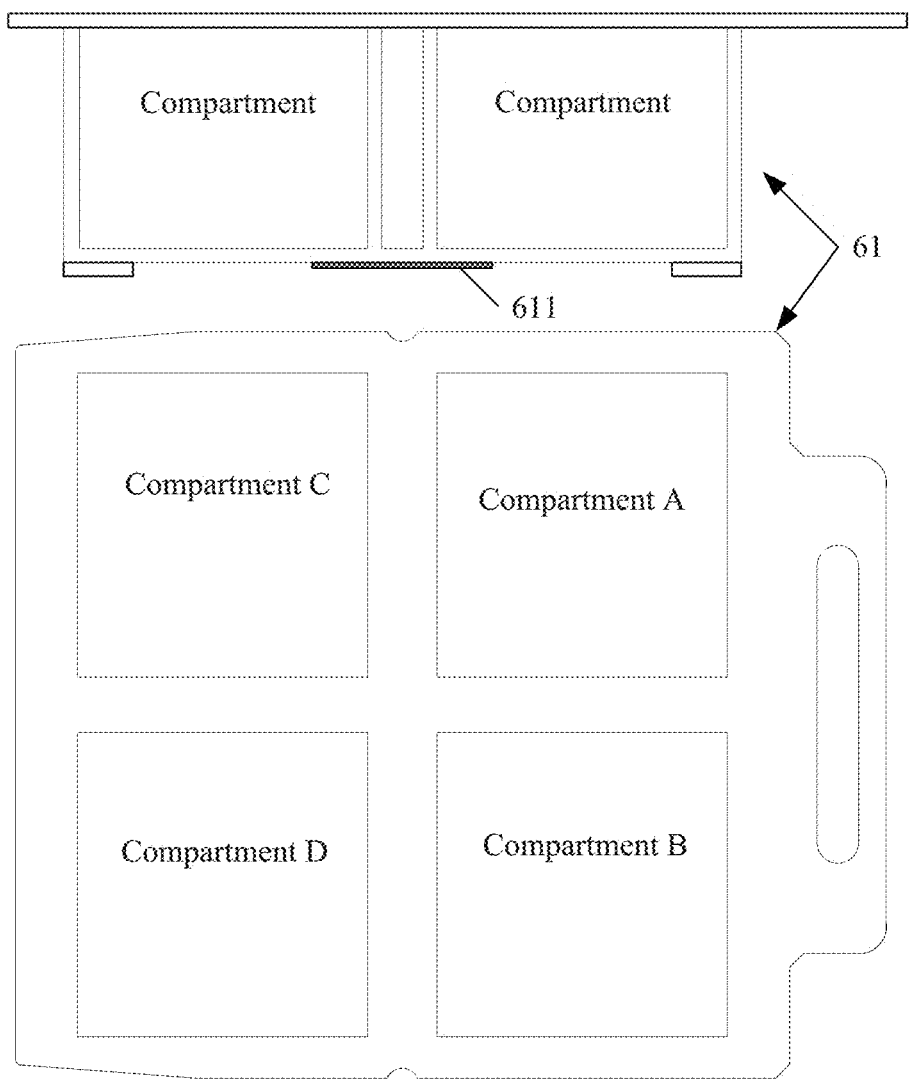
FIG. 8 is a structural schematic drawing of a major ingredient standard package with four compartments employed by a programmable controlled intelligent cooking machine according to an embodiment of the present invention.

Referring to FIG. 7, the automatic ingredient feeding device 6 is arranged right above the wok 11, the housing 100 is arranged on the side wall with an ingredient chamber opening corresponding to the automatic ingredient feeding device 6, so as to enable the user to feed the major ingredient into the automatic ingredient feeding device 6. In the present embodiment, the ingredients are stocked in a four-compartment standard package box 61 (referring to FIG. 8) and particularly are stocked respectively in individual compartments (compartment A, compartment B, compartment C, compartment D) of one package, wherein various major ingredients and accessory ingredients are selected for various dishes. Furthermore, an electronic tag 611 (two-dimension codes, IC card, RFID, etc.) is attached to the bottom of each standard package box 61. The recommended recipe programs of the standard package, or various information, such as production, storage, delivery, selling information of major ingredients and so on, may be obtained by reading and writing (for example reading by means of the multimedia man-machine interface 11) the information of the electronic tag for common automatic cooking machines to use. According to the control program of the automatic cooking machine, the automatic ingredient feeding device 6 provides major ingredients and accessory ingredients stocked in respective compartments at a predetermined time in a predetermined sequence, wherein the combinations of feeding sequence for each Chinese dish may have up to 24 changes.

The Chinese dish recipe of major ingredients and accessory ingredients, which is a part of Chinese culinary art, usually consists of one to three major ingredients and several accessory ingredients. For example, the dish "fried sliced cabbage" uses cabbage as a major ingredient, and uses chili, garlic and so on as accessory ingredients. The dish "Sliced Meat with Dry Tofu and Green Pepper" uses shredded green pepper, shredded meat, and dry tofu as the major ingredients, and uses garlic and red pepper as accessory ingredients. The major ingredients and accessory ingredients of a Chinese dish are respectively placed in respective compartments of one package, depending on whether these major ingredients and accessory ingredients can be put into the wok at the same time. The major ingredients and accessory ingredients which can be put into the wok at the same time may be stocked in one compartment. If the major ingredients and accessory ingredients of a certain Chinese dish are placed in a package with four standard compartments, it means the major ingredients and accessory ingredients can be put into the wok in four groups at four different stages at most, thus it has 24 feeding sequence combinations at most (abcd, abdc, acbd, acdb, adbc, adcb, bacd, badc, bdac, bdca, bcad, bcda, cabd, cadb, cbad, cbda, cdab, cdba, dabc, dacb, dbac, dbca, dcab, dcba). Generally, it is enough to meet the requirement of Chinese culinary art for most dishes. Moreover, a standard package with more compartments, such as six compartments or eight compartments, may meet the requirement of more complicated cooking technique and meet the feeding requirement of high grade commercial automated cooking machines.

The key point for realizing industrialization of the automated Chinese dish cooking machines is that, the major ingredients and accessory ingredients of a certain Chinese dish are selected according to various cooking requirements, stocked in a standard package and particularly stocked respectively in individual compartments of one package. Thus, a complete industrial chain, including the specialized production of agricultural products in the upstream, pre-treating (cleaning and cutting etc.) on the spot, packaging at the consumption place, delivery, and consumption of the automated cooking machine, can thus be established. It brings a new life style, which is different from the traditional style buying primary agricultural products in markets and producing large quantity of living rubbish. On the other hand, due to the use of standard package, the production of the agricultural products may realize intensification, large-scale, standardized and industrialization production, which provides a back tracking mechanism for food safety guarantee. In addition, Internet of Things technology, such as two-dimension codes, IC card, RFID and so on, may be applied to the standard package of major ingredients and accessory ingredients and preset in the package, so as to facilitate the identification of recommended recipe program and other agricultural products information for general automated cooking machines.

Referring to FIG. 7, the automatic ingredient feeding device 6 comprises an ingredient feeding sub-controlling system 601, an ingredient receiving component 602, a releasing component 603 and an ingredient feeding guide groove 604. In the present embodiment, the ingredient receiving component 602 is an openable four-compartment ingredient-dropping chamber, which is arranged corresponding to the four-compartment standard package box 61 with openings face to face and one to one correspondence. When the automatic ingredient feeding device 6 is rotated 180 degrees overall by a turnover mechanism, the major ingredients and accessory ingredients originally stocked in the standard package box fall into the ingredient-dropping chamber under gravity. The releasing component 603 is used for actuating the bottom door of the double-door openable four-compartment ingredient-dropping chamber. When double-door of the chamber are opened, the major ingredients and accessory ingredients fall into the wok 11 right below it along the feeding guide groove 604 under gravity. The ingredient receiving component 602 and the releasing component 603 are connected with the feeding sub-controlling system 601 and are controlled by it. The feeding sub-controlling system 601 is connected with the electrical control device 10, so as to receive major ingredient feeding control commands and control the releasing of the major ingredients and accessory ingredients stocked in respective compartments to the wok 11 at a predetermined time in a predetermined sequence on the basis of the control commands.

Figure 9:
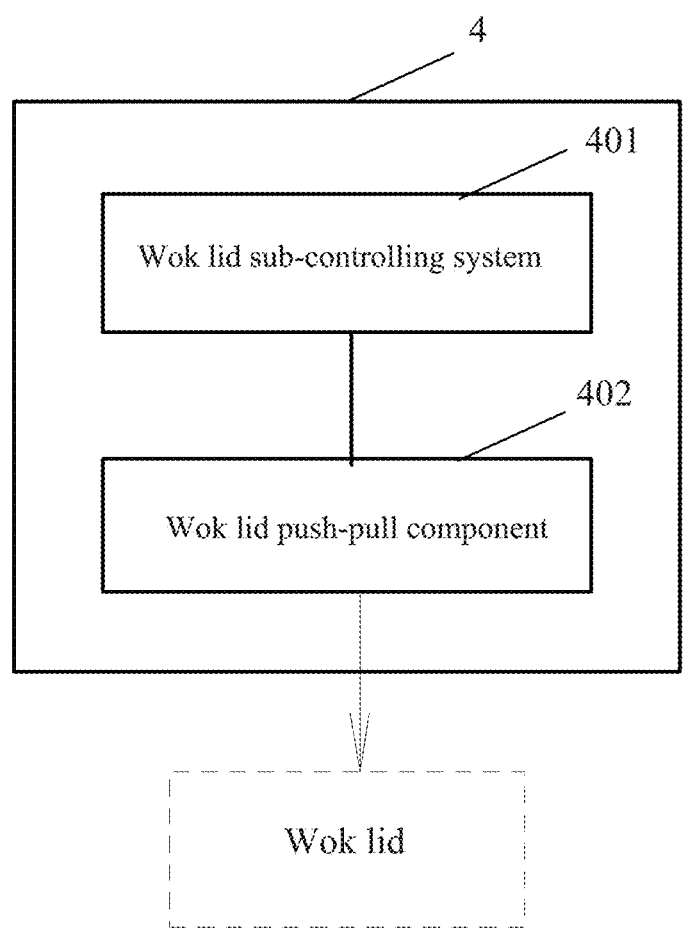
FIG. 9 is a composition block diagram of a wok lid controlling device of the programmable controlled intelligent cooking machine shown in FIG. 1.

Referring to FIG. 9, the wok lid controlling device 4 comprises a wok lid sub-controlling system 401 and a wok lid push-pull component 402 fixedly connected with the wok lid 41, wherein the wok lid sub-controlling system 401 is connected with the electrical control device 10, so as to receive the control commands of opening or closing the wok lid and control the wok lid push-pull component 402 to pull or push the wok lid, thereby realizing the opening and closing of the wok lid 41. In the present embodiment, the wok lid controlling device 4 is arranged inside of the housing 100 and particularly on the side wall right of the wok 11, with the wok lid at a position having a 45-55 degrees angle to the wok 11.

Figure 10:
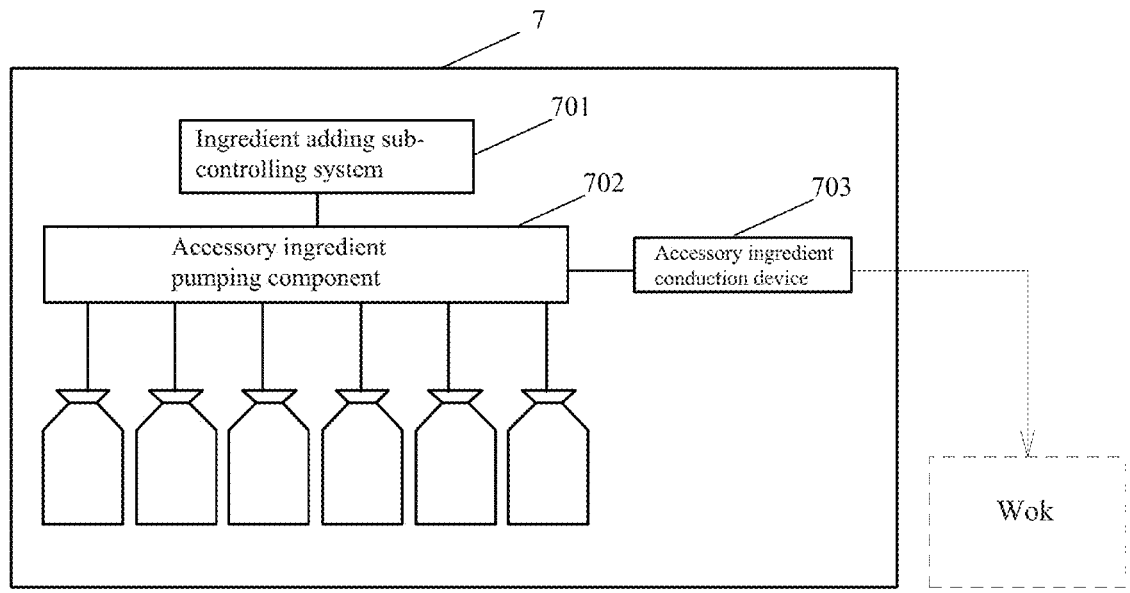
FIG. 10 is a composition block diagram of an automatic accessory ingredient adding device of the programmable controlled intelligent cooking machine shown in FIG. 1.

Referring to FIG. 10, the automatic accessory ingredient adding device 7 comprises an ingredient adding sub-controlling system 701, an accessory ingredient pumping component 702 and an accessory ingredient conduction pipe 703. In the present embodiment, the wok lid 41 is provided with an opening for connecting the accessory ingredient conduction pipe 703. The ingredient adding sub-controlling system 701 is connected with the electrical control device 10 so as to receive the control commands of adding accessory ingredients. The accessory ingredient pumping component 702 is connected with a plurality of accessory ingredient storage devices (standard liquid package for accessory ingredients) which store various liquid accessory ingredients. An appropriate amount of the corresponding accessory ingredient is pumped out and added into the wok 11 via the accessory ingredient conduction pipe 703 under the control of the ingredient adding sub-controlling system 701. The program control releasing of the accessory ingredients (seasonings) is realized by standard liquid package and the pumping device. All accessory ingredients (seasonings) are packaged by liquid package, prepared as common ingredients (cooking oil, liquid salt, soy sauce, vinegar, cooking wine, liquid sugar, spicy sauce, soup stock, sesame oil, etc.), and stocked in individual containers. The automatic accessory ingredient adding device 7 pumps and releases a predetermined amount of accessory ingredients at a predetermined time in a predetermined sequence according to the preset recipe program. In the present embodiment, the automatic accessory ingredient adding device 7 is arranged inside of the housing 100 and particularly on the side wall back of the wok 11.

Figure 11:
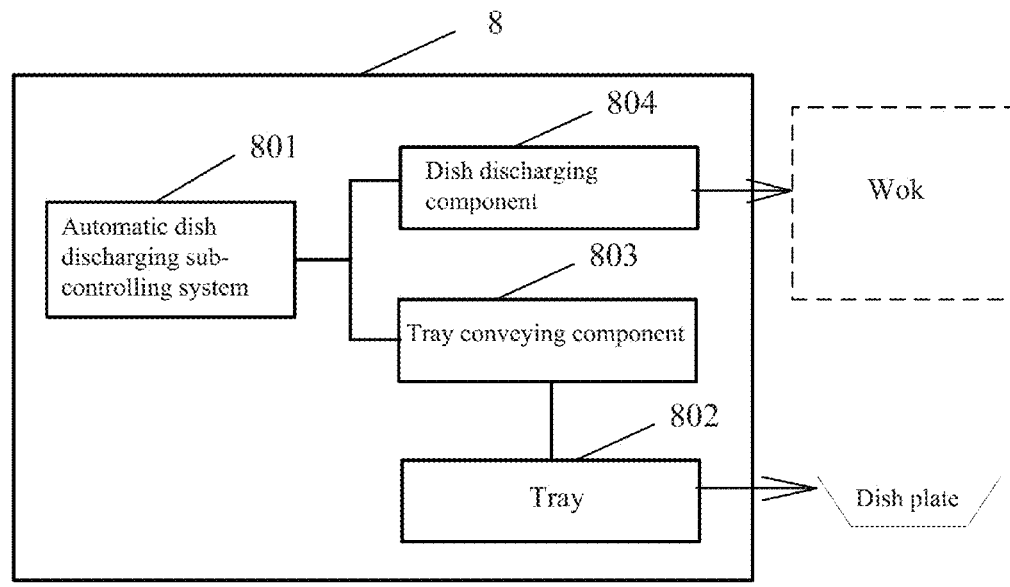
FIG. 11 is a composition block diagram of an automatic dish discharging device of the programmable controlled intelligent cooking machine shown in FIG. 1.

Referring to FIG. 11, the automatic dish discharging device 8 comprises a dish discharging sub-controlling system 801, a tray 802, a tray conveying component 803 and a dish discharging component 804. In the present embodiment, the automatic dish discharging device 8 is arranged below the wok 11 and on the right of it. The housing 100 is provided with a dish plate opening on the right wall at the position opposite to the automatic dish discharging device 8, so as to enable the user to put the dish plate on the tray 801. The tray 801 is used for carrying the dish plate, and the tray conveying component 803 is used for conveying the tray 802 to a best position for dish discharging (right below and close to the wok 11) or a best position for dish taking (dish plate opening). The dish discharging component 804 is used for discharging the fried dish in the wok 11 into the dish plate. In the present embodiment, the dish discharging is realized by the wok working position controlling device 3, without the need of extra dish discharging component 804. The dish discharging sub-controlling system 801 is connected with the electrical control device 10 so as to receive dish discharging control command and control the tray conveying component and the dish discharging component to perform dish discharging operation.

Figure 12:
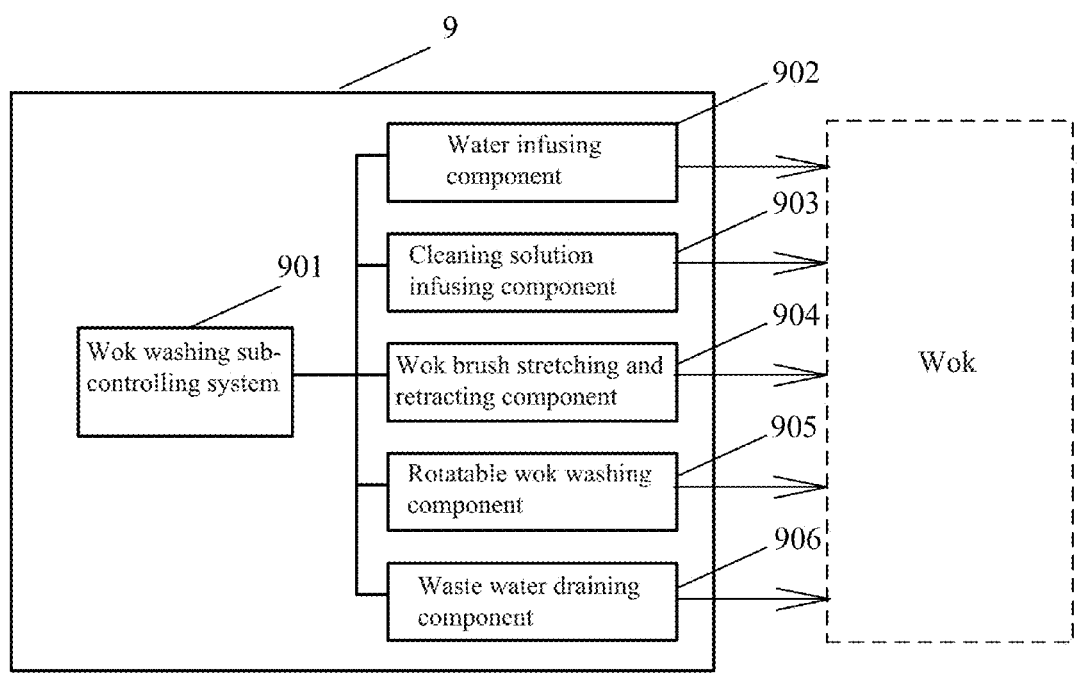
FIG. 12 is a composition block diagram of an automatic wok washing device of the programmable controlled intelligent cooking machine shown in FIG. 1.
Figure 13:
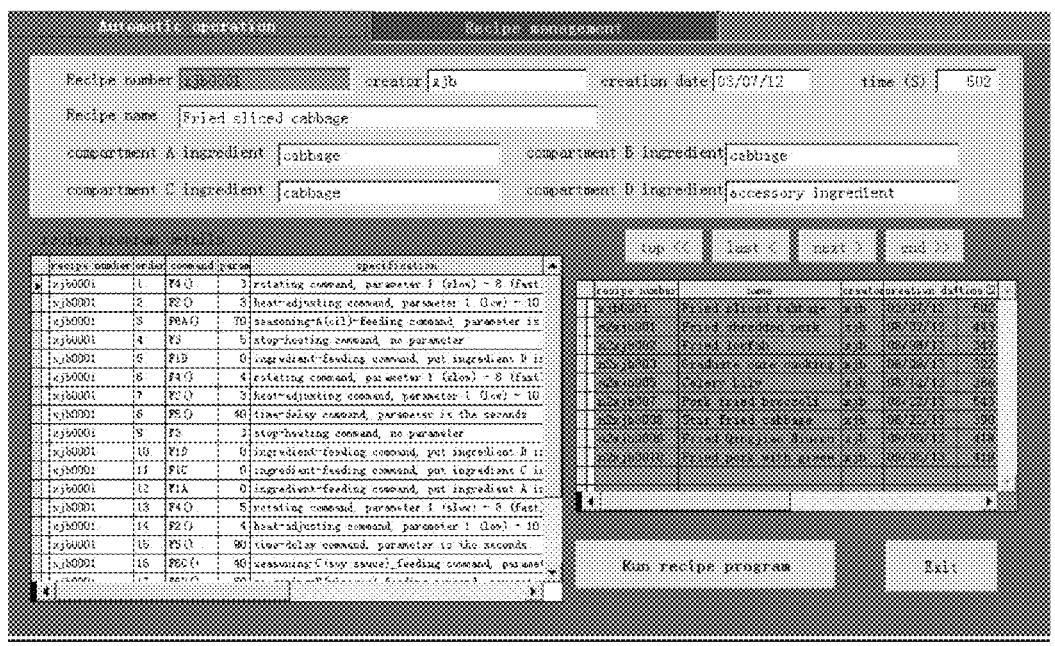
FIG. 13 is an exemplary graph of a multimedia man-machine interface of a programmable controlled intelligent cooking machine according to an embodiment of the present invention.

Referring to FIG. 12, the automatic wok washing device 9 comprises a wok washing sub-controlling system 901, a water infusing component 902, a cleaning solution infusing component 903, a wok brush stretching and retracting component 904, a rotatable wok washing component 905 and a waste water draining component 906. The wok washing sub-controlling system 901 is connected with the electrical control device 10 so as to receive wok washing control command and control the water infusing component 902, the cleaning solution infusing component 903, the wok brush stretching and retracting component 904, the rotatable wok washing component 905 and the waste water draining component 906 to perform wok washing operation. In the present embodiment, the wok washing and the waste water draining are realized by the rotating device 2 and the wok working position controlling device 3, without the need of extra rotatable wok washing component 905 or waste water draining component 906. In the present embodiment, the wok is actively washed by infusing water and cleaning solution into the wok and rotating the wok brush and the wok cooperatively. Since the wok 11 is coated with a non-stick material layer on the internal wall, it provides best cleaning effect. In addition, in the present embodiment, the automatic wok washing device 9 is arranged inside of the housing 100 and particularly on the side wall left of the wok 11, and the reception basin is arranged below the wok 11 and on the left of it.

In the present embodiment, the multimedia man-machine interface 11 is arranged on a certain external wall of the housing 100. FIG. 101 shows an embodiment of the multimedia man-machine interface 101, comprising five regions: relevant parameter viewing area of recipe program conformance statement, listing and viewing area of recipe program executable command sequence, management operating area of recipe program, listing and viewing area of recipe program and management functional area of recipe program such as outputting XML document and so on. The multimedia man-machine interface 101 interacts with the user by multimedia, such as image, text, video and audio, and displays the status, running process, operating tips, etc. of the automated cooking machines. Users may program recipe programs by themselves by the multimedia man-machine interface 101, or directly call a large number of recipe programs of Chinese dishes stored in the machine, or input external general recipe programs via the network interface 102.

The intelligent cooking machine of the present invention is a general-purpose programmable controlled Chinese dish cooking machine, which is particularly capable of automatically completing Chinese dish cooking process according to the recipe program programmed on the basis of vmmda1.0 general recipe commands.

That is, the program specification of the accepted recipe program supports vmmda1.0 general recipe commands of automatic Chinese dish cooking, which includes nine commands: F1 ingredient feeding command, F2 heat-adjusting command, F3 stop-heating command, F4 rotating command, F5 time delay command, F6 seasoning-feeding command, F7 open-lid command, F8 dish discharging command, F9 pause command. The recipe program programmed on the basis of the program specification runs by pipelined single task. The automated cooking machine of the present invention interprets and executes the recipe program according to the command sequence.

The general recipe program specification can be written in XML '1.0' and encoded in gb2312 for better data exchange and information sharing across platforms. So besides the programmable controlled intelligent cooking machine of the present invention, the recipe program can also be applied to a virtual cooking machine, cloud services, Internet of Things terminal, and so on.

The recipe program includes two parts, conformance statement and executable command sequence.

The conformance statement mainly includes: recipe program version, recipe number, recipe name, creator, creation date, major ingredient packaging version and major ingredient name.

The executable command sequence consists of vmmda1.0 general recipe commands of automatic Chinese dish cooking. As illustrated in Table 1 below, the basic syntax is as follows: index command; comment (may be omitted). Each line permits one command only. Generally, the whole executable command sequence should not be over 5000 lines.

TABLE 1

| Index | Command | Comment |
|---|---|---|
| 1 | F2( ),1; | Heat-adjusting command, parameter: 1(low)-10(high) |
| 2 | F5( ),30; | Time-delay command, parameter: seconds |
| 3 | F6A( ),70; | Seasoning A(oil) feeding command, parameter: mL |

The programmable controlled intelligent cooking machine of the present invention executes each command according to the index sequence. The index can be omitted, and then the programmable controlled intelligent cooking machine executes each command from the top to the bottom. In the following example, the command sequences in Table 2 (a), Table 2 (b) and Table 2 (c) have the same function of executable command sequence.

TABLE 2 (a)

| 1 | F2( ),1; | Heat-adjusting command, parameter: 1(low)-10(high) |
|---|---|---|
| 2 | F5( ),30; | Time-delay command, parameter: seconds |
| 3 | F6A( ),70; | Seasoning A(oil) feeding command, parameter: mL |

TABLE 2 (b)

| F2( ), 1 |
|---|
| F5( ), 30 |
| F6A( ), 70 |

TABLE 2 (c)

| 2 | F5( ), 30 |
|---|---|
| 1 | F2( ), 1 |
| 3 | F6A( ), 70 |

All text editors may be used for writing the general recipe program. The recipe program may be written in XML '1.0' and encoded in gb2312. The root element is "cooking_machine_recipe", the sub-elements include "ingredient_package" and "recipe_command".

The root element "cooking_machine_recipe" has attributes as follows: recipe program version, recipe number, recipe name, creator and creation date. For example: <cooking_machine_recipe version='vmmda 1.0' recipe_number='xjb0001' recipe_name='fried sliced cabbage' creator='xjb' date='03/07/12'>

The sub-element "ingredient package" is a null element with attributes as follows: version, compartment-A ingredient, compartment-B ingredient, compartment-C ingredient, compartment-D ingredient. For example: <ingredient_package version='vmmda 1.0' compartment-A_ingredient='cabbage' compartment-B_ingredient='cabbage' compartment-C_ingredient='accessory ingredient' compartment-D_ingredient=' '></ingredient_package>

The sub-element "recipe_command" has attributes as follows: step, command code, parameter. The value of the sub-element "recipe command" is the comment. For example:

<recipe_command step='2' command_code='F2(3)'
        parameter='3'>heat-adjusting command,param-
        eter 1(low)-10(high)</recipe_command>

The complete format of the recipe program is shown as follows:

<?xml version='1.0' encoding='gb2312'?>

<cooking_machine_recipe version='vmmda 1.0'
        recipe_number='xjb0001' recipe_name='fried
        sliced cabbage' creator='xjb' date='03/07/12'>

<ingredient_package version='vmmda 1.0'
        compartment_A_ingredient='cabbage'
        compartment_B_ingredient='cabbage'
        compartment_C_ingredient='accessory ingredi-
        ent' compartment_D_ingredient=' '></ingredi-
        ent_package>

<recipe_command step='1' command_code='F4(3)'
        parameter='3'>rotating command,parameter
        1(slow)-8(fast)</recipe_command>

<recipe_command step='2' command_code='F2(3)'
        parameter='3'>heat-adjusting command,param-
        eter 1(low)-10(high)</recipe_command>

</cooking_machine_recipe>

As an example, a recipe program for cooking fried sliced cabbage is given as below.

<?xml version='1.0' encoding='gb2312'?>

```
<cooking_machine_recipe version='vmmda 1.0'
    recipe_number='xjb0001' recipe_name='fried
    sliced cabbage' estimated_time='437'
    creator='xjb' date='03/07/12'>

<ingredient_package version='vmmda 1.0'
    compartment_A_ingredient='cabbage'
    compartment_B_ingredient='cabbage'
    compartment_C_ingredient='cabbage'
    compartment_D_ingredient='accessory ingredi-
    ent(garlics,etc.)'></ingredient_package>

<recipe_command step='1' command_code='F4( )'
    parameter='3'>rotating command,parameter
    1(slow)-8(fast)</recipe_command>

<recipe_command step='2' command_code='F2( )'
    parameter='1'>heat-adjusting command,param-
    eter 1(low)-10(high)</recipe_command>

<recipe_command step='3' command_code='F6A( )'
    parameter='40'>seasoning-A(oil)-feeding com-
    mand,parameter is mL</recipe_command>

<recipe_command step='4' command_code='F3'
    parameter='0'>stop-heating command,no
    parameter</recipe_command>

<recipe_command step='5' command_code='F1D'
    parameter='0'>ingredient-feeding command,put
    ingredient D into the wok,no parameter</recipe-
    _command>

<recipe_command step='6' command_code='F4( )'
    parameter='3'>rotating command,parameter
    1(slow)-8(fast)</recipe_command>

<recipe_command step='7' command_code='F2( )'
    parameter='2'>heat-adjusting command,param-
    eter 1(low)-10(high)</recipe_command>

<recipe_command step='8' command_code='F5( )'
    parameter='20'>time-delay command,parameter
    is the seconds</recipe_command>

<recipe_command step='9' command_code='F3'
    parameter='3'>stop-heating command,no
    parameter</recipe_command>

<recipe_command step='10' command_code='F1A'
    parameter='0'>ingredient-feeding command,put
    ingredient A into the wok,no parameter</recipe-
    _command>

<recipe_command step='11' command_code='F1B'
    parameter='0'>ingredient-feeding command,put
    ingredient B into the wok,no parameter</recipe-
    _command>

<recipe_command step='12' command_code='F1C'
    parameter='0'>ingredient-feeding command,put
    ingredient C into the wok,no parameter</recipe-
    _command>

<recipe_command step='13' command_code='F4( )'
    parameter='5'>rotating command,parameter
    1(slow)-8(fast)</recipe_command>

<recipe_command step='14' command_code='F2( )'
    parameter='2'>heat-adjusting command,param-
    eter 1(low)-10(high)</recipe_command>

<recipe_command step='15' command_code='F5( )'
    parameter='100'>time-delay command,param-
    eter is the seconds</recipe_command>

<recipe_command step='16' command_code='F6G(
    )' parameter='50'>seasoning-C(soy sauce)_feed-
    ing command,parameter is mL</recipe_com-
    mand>

<recipe_command step='17' command_code='F6D(
    )' parameter='20'>seasoning-D(vinegar)_feed-
    ing command,parameter is mL</recipe_com-
    mand>

<recipe_command step='18' command_code='F6G(
    )' parameter='10'>seasoning-G(sesame oil)
    _feeding command,parameter is mL</recipe-
    _command>

<recipe_command step='19' command_code='F5( )'
    parameter='100'>time-delay command,param-
    eter is the seconds</recipe_command>

<recipe_command step='20' command_code='F3'
    parameter='0'>stop-heating command,no
    parameter</recipe_command>

<recipe_command step='21' command_code='F5( )'
    parameter='100'>time-delay command,param-
    eter is the seconds</recipe_command>

<recipe_command step='22' command_code='F9'
    parameter='0'>halt command,no parameter</
    recipe_command>

</cooking_machine_recipe>
```

The recipe program programmed with vmmda 1.0 general recipe command has function features as follows:

(1) It realizes precise heating control required by Chinese culinary art;

(2) It realizes precise control of ingredient (major ingredients and accessory ingredients, seasoning, etc.) feeding required by Chinese culinary art, feeding major ingredients and accessory ingredients at a predetermined time in a predetermined sequence, and feeding a predetermined amount of seasoning at a predetermined time in a predetermined sequence;

(3) It realizes the control of rotatably stir-frying ingredients required by Chinese culinary art.

All automated cooking machines supporting vmmda 1.0 general recipe command may realize various cooking operations according to the recipe program, thereby realizing full-automatic cooking.

In addition, it is possible to create a recipe program library (recipe program database) for multiple Chinese culinary arts by vmmda 1.0 general recipe command. Not only standard recipe programs for various Chinese dishes, but also recipe programs for one Chinese dish with various flavors, may be programmed.

It can be understood that, except for automatically processing Chinese dish cooking according to the recipe program programmed by the vmmda 1.0 general recipe command, the programmable controlled intelligent cooking machine of the present invention also accepts the recipe programs programmed by other general recipe commands.

It can be understood that, when editing recipe programs, the user only needs to consider the cooking process (ends till the dish is finished). Subsequent operations, such as dish discharging, wok washing and so on, do not belong to cooking process, so it is not necessary to edit corresponding commands. Therefore, the programmable controlled intelligent cooking machine of the present invention may set unified dish discharging command (accordingly provides a dish discharging button) and wok washing command (accordingly provides a wok washing button), so as to automatically perform a series of processes to discharge the dish and a series of processes to wash the wok.

Referring to FIG. 14-FIG. 19, the Chinese dish cooking process, which is automatically performed by the programmable controlled intelligent cooking machine of the present invention according to the recipe program programmed with vmmda 1.0 general recipe command, is illustrated in detail as below (described in conjunction with the embodiment of the above recipe program for fried sliced cabbage).

The user turns on the programmable controlled intelligent cooking machine of the present invention, and accordingly inputs or selects the corresponding recipe program for fried sliced cabbage.

The user accordingly places the four-compartment standard packaged ingredient of sliced cabbage into the automatic ingredient feeding device 6, and opens the programmable controlled intelligent cooking machine to execute recipe program.

Figure 14:
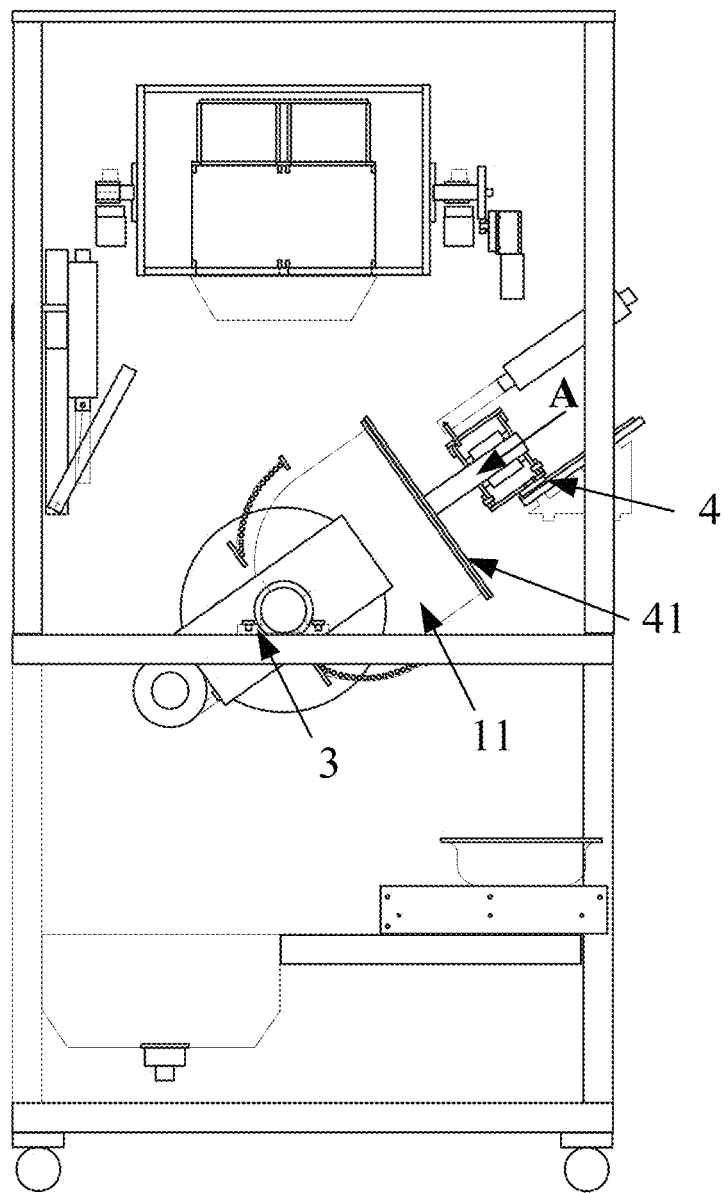
FIGS. 14-19 show the working process of a programmable controlled intelligent cooking machine according to an embodiment of the present invention.

At first, when the electromagnetic heating controlling device receives rotating control command F4, the wok 11 is rotated to stir-frying working position, and the wok lid controlling device 4 pushes the wok lid 41 to close the wok 11. Then, the wok rotating device 2 correspondingly rotates the wok 11 according to rotating control command F4 (step 1), and then heats the wok 11 according to heating control command F2 (step 2). When the wok working position controlling device 3 receives accessory ingredient adding control command F6, the wok 11 is rotated to accessory ingredient adding working position (stir-frying working position). Then, the wok lid controlling device 4 pushes the wok lid 41 to close the wok 11. Meanwhile, according to accessory ingredient adding control command F6, the automatic accessory ingredient adding device pumps an appropriate amount of corresponding accessory ingredient (oil) into the wok 11 and heats it (step 3). At the moment, the programmable controlled intelligent cooking machine is in a working state as shown in FIG. 14, wherein an arrow A shows the flow direction of the accessory ingredient (oil).

After that, when receiving Turn-off control command F3, the electromagnetic heating controlling device stops heating the wok 11 (step 4).

Figure 15:
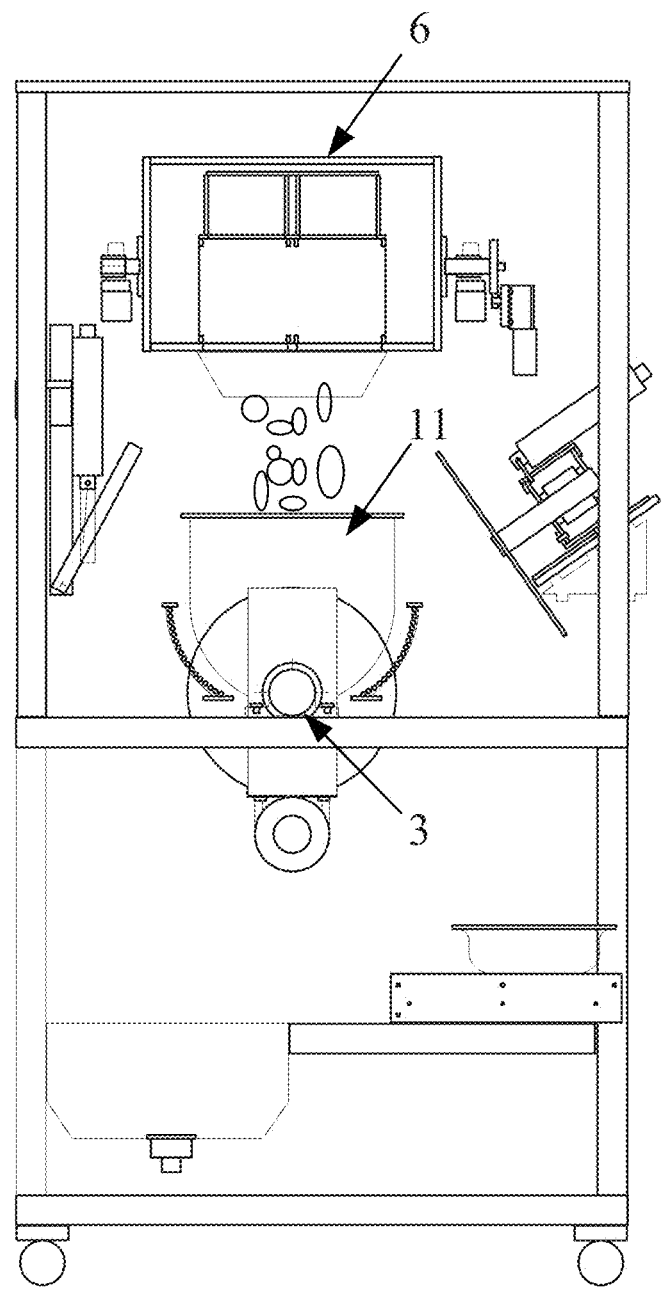

Then, when the wok working position controlling device 3 receives major ingredient feeding control command F1, the wok lid controlling device 4 pulls back the wok lid 41 to open the wok 11 at first, and then the wok 11 is rotated to major ingredient feeding working position, after that, the automatic ingredient feeding device 6 places the major ingredient stocked in the compartment D into the wok 11 according to major ingredient feeding control command F1 (step 5). At the moment, the programmable controlled intelligent cooking machine is in a working state as shown in FIG. 15.

Figure 16:
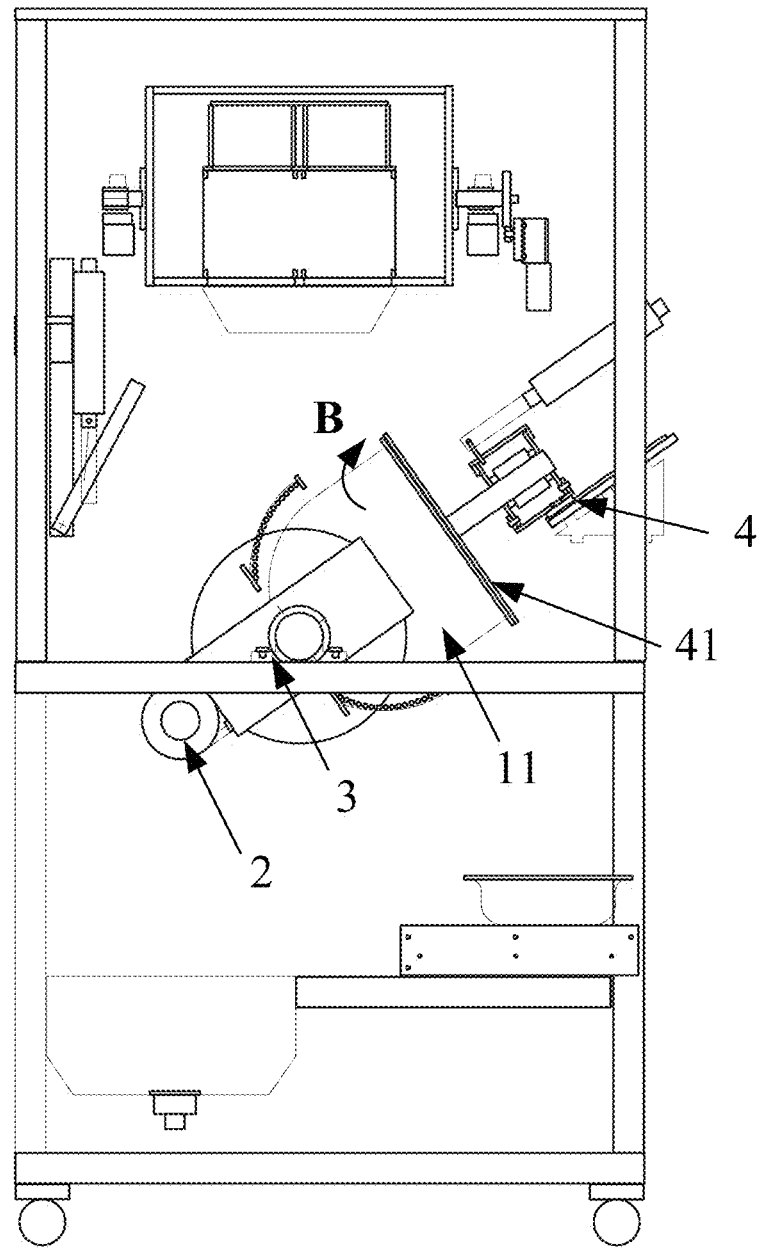

After that, when receiving rotating control command F4, the wok working position controlling device 3 rotates the wok 11 to the stir-frying working position, and the wok lid controlling device 4 pushes the wok lid 41 to close the wok 11. Then, the wok rotating device 2 correspondingly rotates the wok 11 according to the rotating control command F4 (step 6). Meanwhile, when receiving heating control command F2, the electromagnetic heating controlling device heats the wok (step 7) and control the heating time according to time delay command F5 (step 8). At the moment, the programmable controlled intelligent cooking machine is in a working state as shown in FIG. 16, wherein an arrow B shows the rotating direction of the wok 11. When receiving Turn-off control command F3, the electromagnetic heating controlling device stops heating the wok 11 (step 9).

The steps after step 9 are repeated steps and need not be repeated here.

When executing F9 pause command at step 22, the electromagnetic heating controlling device receives turn-off control command F3 at first and stops heating the wok 11, the wok lid controlling device 4 pulls back the wok lid 41 to open the wok 11, the wok rotating device 2 rotates the wok to the ingredient feeding working position and stops rotating the wok 11. By this time, the cooking process is finished.

Figure 17:
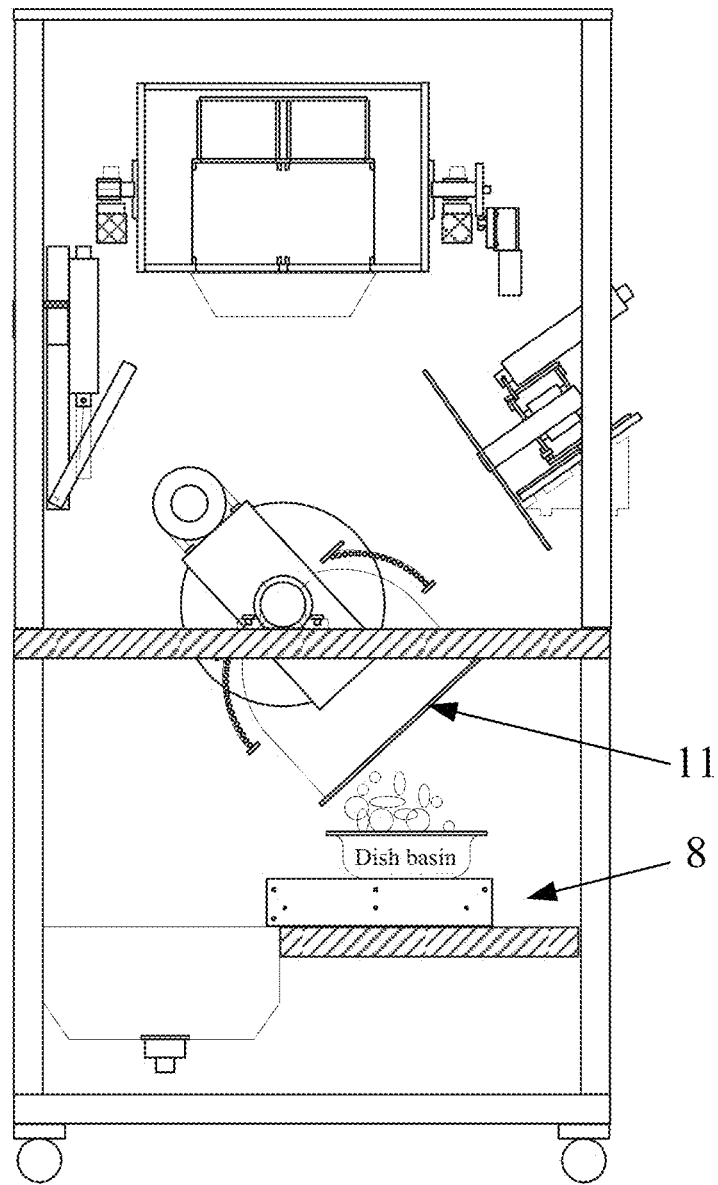

At the moment, the user may put a dish plate on the tray of the automatic dish discharging device 8 and press the dish discharging button (i.e. send a dish discharging control command). Then, the automatic dish discharging device 8 conveys the dish plate to a best position for dish discharging according to the dish discharging control command. After that, the wok working position controlling device rotates the wok 11 to dish discharging working position according to the dish discharging control command, so as to pour the fried sliced cabbage onto the dish plate. At the moment, the programmable controlled intelligent cooking machine is in a working state as shown in FIG. 17. After that, the automatic dish discharging device 8 conveys the dish plate to a best position for dish taking (dish plate opening) so as to enable the user to take.

Figure 18:
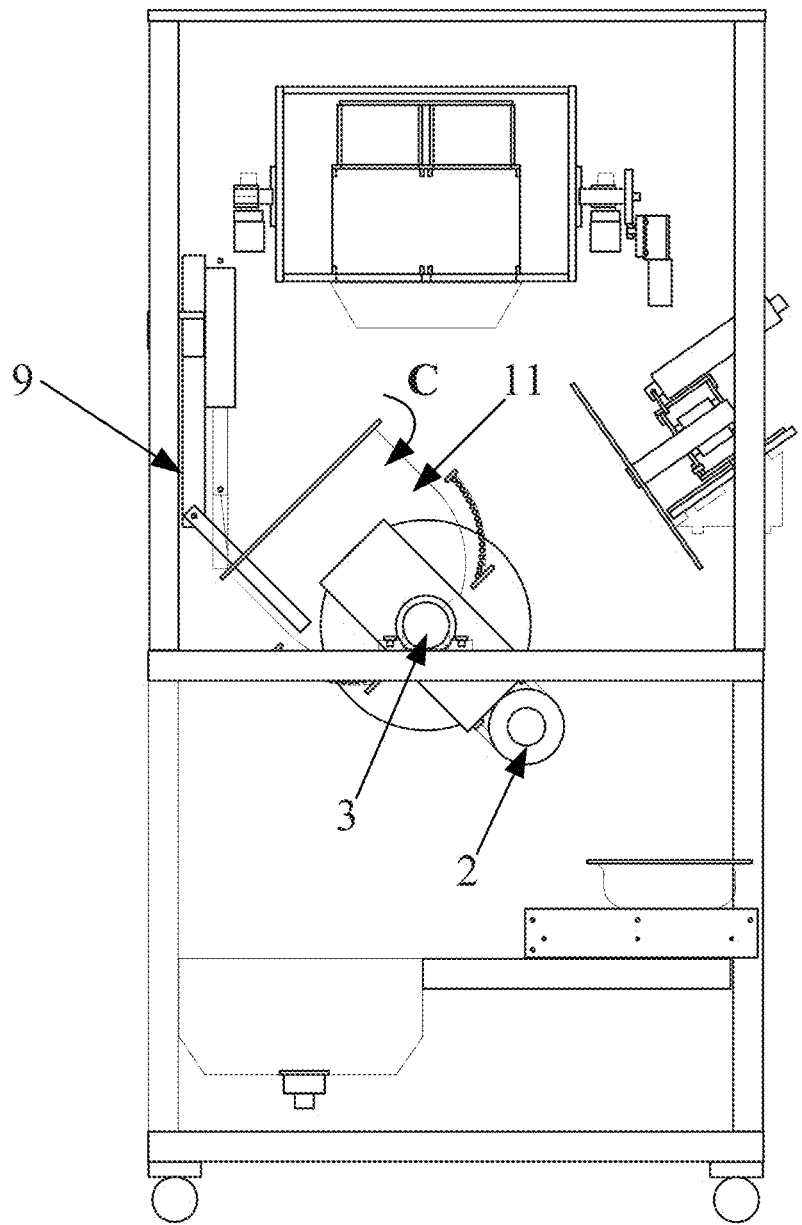

After that, the user may press the wok washing button (i.e. send a wok washing control command), then the wok working position controlling device 3 rotates the wok 11 to a wok washing working position according to the wok washing control command. Then, the automatic wok washing device 9 infuses water, cleaning solution into the wok 11 and stretches out the wok brush, and rotates the wok 11 by the wok rotating device 2 so as to cooperate with the wok brush to wash the internal wall of the wok. At the moment, the programmable controlled intelligent cooking machine is in a working state as shown in FIG. 18, wherein an arrow C shows the rotating direction of the wok 11.

Figure 19:
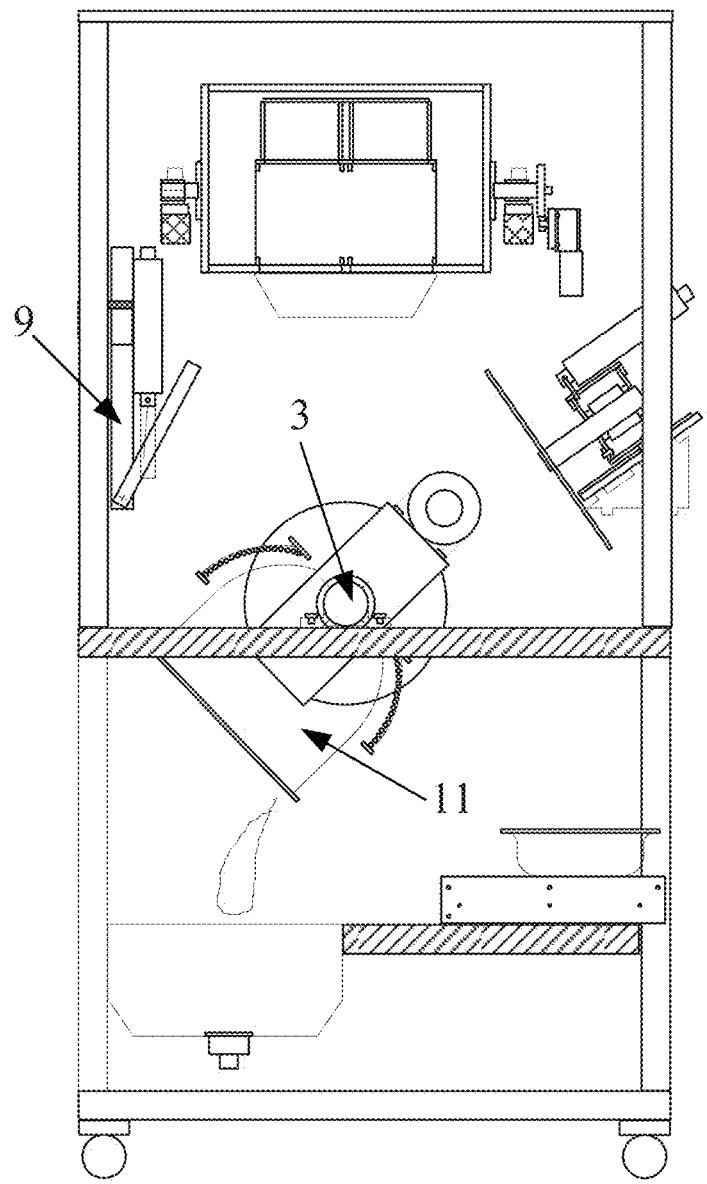

After the wok is washed, the automatic wok washing device 9 retracts the wok brush. Meanwhile, the wok working position controlling device 3 rotates the wok 11 to water draining working position, so as to pour the waste water into the reception basin. At the moment, the programmable controlled intelligent cooking machine is in a working state as shown in FIG. 19.

It should be noted that, the above recipe program does not employ F7 open-lid command. Since the closing/opening of the wok lid is relevant with other commands in practical applications and do not need independent command for controlling, when the electrical control device receives corresponding commands, it may perform close-lid/open-lid operation at the same time according to the commands. The operations executed by respective command comprise:

F4 rotating command: adjust the wok to stir-frying working position/close the wok lid/rotate the wok.

F6 accessory ingredient command: only when the wok is in stir-frying working position/add accessory ingredient.

F1 ingredient feeding command: open the wok lid/adjust the wok to ingredient feeding working position/supply ingredient.

F2/F3 heat-adjusting command: not relevant with the working position.

F9 pause command: turn off the heat/open the wok lid/stop rotating/adjust the wok to ingredient feeding working position.

F5 time delay command: maintain the previous state.

The above recipe program for fried sliced cabbage comprises steps as follows: steps 1-4: heat the wok/add oil; steps 5-9: add accessory ingredients such as garlic and so on, and stir-fry them; steps 10-12: add cabbage ingredient; steps 13-15: turn the fire up and stir-fry for 100 s; steps 16-18: keep stir-frying and meanwhile add seasoning; steps 19-22: keep stir-frying for 100 s and turn the fire off, then keep stir-frying for 100 s with the remaining heat of the wok, then halt the machine, the dish is finished to be discharged.

From the above, the programmable controlled intelligent cooking machine provided by the present invention has advantages as follows:

1. Maximum compatibility. It is capable of running the recipe program programmed with all complex general recipe commands (e.g. vmmda1.0), interpreting and executing the recipe program according to the command sequence, so as to perform various cooking operations and cook dishes with various flavors according to various recipe programs.

2. Minimum manual intervention (Except that the ingredient package is manually placed into the ingredient chamber opening of the cooking machine, all the rest operations are performed by the machine). It may realize functions such as automatically feeding major ingredient, automatically adding accessory ingredient, automatically discharging dish, automatically washing wok and so on, whereby realizing full-automatic cooking.

3. It may accept the recipe program programmed with general recipe commands in many ways. Users may program recipe programs by themselves, or directly call a large number of recipe programs of Chinese dishes stored in the machine, or input external recipe programs via the network.

4. Generality. It supports general recipe commands so the recipe program may be shared; it supports four-compartment standard package so the major ingredient of Chinese dish may be standardized produced/stocked/transported/sold; it supports standard liquid package for accessory ingredients (condiment and seasoning) so the accessory ingredients may be standardized produced/stocked/transported/sold.

The foregoing descriptions are merely exemplary embodiments of the present invention, but are not intended to limit the present disclosure. Any modifications, equivalent substitutions, and improvements made by those skilled in the art within the spirit and principle of the present disclosure shall fall within the protection scope of the present disclosure.

What is claimed is:

1. A programmable controlled intelligent cooking machine, characterized by comprising: a housing and a wok arranged inside of the housing, an electromagnetic heating coil, a wok rotating device, a wok working position controlling device, a wok lid and a wok lid controlling device, an electromagnetic heating controlling device, an automatic ingredient feeding device, an automatic accessory ingredient adding device, an automatic dish discharging device, an automatic wok washing device and an electrical control device;

wherein the wok rotating device, the electromagnetic heating controlling device, the automatic ingredient feeding device, the automatic accessory ingredient adding device, the automatic dish discharging device and the automatic wok washing device are set in different directions of the wok working position controlling device to surround the wok working position controlling device; the electromagnetic heating coil winds around the external wall of the wok and heat the wok under the control of the electromagnetic heating controlling device; the wok rotating device is connected with the wok so as to control the wok to rotate on the axis of the wok during heating process for the wok; the wok working position controlling device is used for securing the wok and controlling the wok to turn by different rotation angles, so as to drive the wok to turn to corresponding working position and enable an opening of the wok to face the direction of one of the automatic ingredient feeding device, the automatic accessory ingredient adding device, the wok lid and the wok lid controlling device, the automatic dish discharging device and the automatic wok washing device to perform corresponding operation; the wok lid controlling device comprises a wok lid sub-controlling system and a wok lid push-pull component fixedly connected with the wok lid, wherein the wok lid sub-controlling system is connected with the electrical control device, so as to receive control command of opening or closing the wok lid and control the wok lid push-pull component to pull or push the wok lid, such that the opening of the wok, which is turned to face the wok lid and the wok lid controlling device by means of the wok working position controlling device, can be opened or closed by the wok lid;

the electrical control device is used for receiving preset recipe command and sending corresponding control command according to the recipe command; the wok rotating device, the wok working position controlling device, the wok lid controlling device, the electromagnetic heating controlling device, the automatic ingredient feeding device, the automatic accessory ingredient adding device, the automatic dish discharging device and the automatic wok washing device are connected with the electrical control device, respectively, and perform corresponding operation according to the received control command, whereby realizing full-automatic cooking.

2. The programmable controlled intelligent cooking machine according to claim 1, characterized in that: the automatic ingredient feeding device is arranged right above the wok, the automatic ingredient feeding device comprises an ingredient feeding sub-controlling system, an ingredient receiving component, a releasing component and an ingredient feeding guide groove, wherein the ingredient feeding sub-controlling system is connected with the electrical control device so as to receive major ingredient feeding control command, the ingredient receiving component and releasing component are used for receiving standard packaged ingredient and releasing the received ingredient to the wok along the ingredient feeding guide groove under the control of the ingredient feeding sub-controlling system.

3. The programmable controlled intelligent cooking machine according to claim 1, characterized in that: the electromagnetic heating controlling device comprises an electromagnetic sub-controlling system, a wok temperature detector and a high frequency driving source, wherein the high frequency driving source is connected with the electromagnetic heating coil, the electromagnetic sub-controlling system is connected with the electrical control device, so as to receive heating control command and control the intensity of the high frequency driving source according to the data detected by the wok temperature detector.

4. The programmable controlled intelligent cooking machine according to claim 1, characterized in that: the automatic accessory ingredient adding device comprises an ingredient adding sub-controlling system, an accessory ingredient pumping component and an accessory ingredient conduction pipe, wherein the ingredient adding sub-controlling system is connected with the electrical control device so as to receive control command of adding accessory ingredient, the wok lid is provided with an opening for connecting the accessory ingredient conduction pipe, the accessory ingredient pumping component is connected with a plurality of accessory ingredient storage devices which store various liquid accessory ingredients, and pumps out an appropriate amount of the corresponding accessory ingredient and adds it into the wok via the accessory ingredient conduction pipe under the control of the ingredient adding sub-controlling system.

5. The programmable controlled intelligent cooking machine according to claim 1, characterized in that: the wok rotating device comprises a rotating sub-controlling system, a motor and a rotating shaft, wherein the rotating sub-controlling system is connected with the electrical control device so as to receive rotating control command, the rotating shaft is fixedly connected with the wok, the motor drives the rotating shaft to rotate under the control of the rotating sub-controlling system and thus drives the wok to rotate.

6. The programmable controlled intelligent cooking machine according to claim 1, characterized in that: the wok working position controlling device comprises a working position sub-controlling system, a position controlling detector, a motor, a main shaft and a wok frame, wherein the wok frame is used for securing the wok and is hold in the housing by the main shaft, the working position sub-controlling system is connected with the electrical control device, so as to receive various control commands, drive the main shaft to rotate on the basis of various control commands and data detected by the position controlling detector, and thus drive the wok to rotate to corresponding working position to perform corresponding operation.

7. The programmable controlled intelligent cooking machine according to claim 1, characterized in that: the automatic wok washing device comprises a wok washing sub-controlling system, a water infusing component, a wok brush stretching and retracting component, a rotatable wok washing component and a waste water draining component, wherein the wok washing sub-controlling system is connected with the electrical control device so as to receive wok washing control command and control the water infusing component, the wok brush stretching and retracting component, the rotatable wok washing component and the waste water draining component to work, whereby finishing the wok washing operation.

8. The programmable controlled intelligent cooking machine according to claim 1, characterized in that: the automatic dish discharging device comprises a dish discharging sub-controlling system, a tray, a tray conveying component and a dish discharging component, wherein the tray is used for carrying the dish plate, the dish discharging sub-controlling system is connected with the electrical control device, so as to receive dish discharging control command and control the tray conveying component and the dish discharging component to work, whereby finishing the dish discharging operation.

9. The programmable controlled intelligent cooking machine according to claim 1, characterized in that: it further comprises a human-computer interface connected with the electrical control device and/or comprises a network interface, wherein users may directly input recipe command via the human-computer interface, or directly call the recipe program stored in the cooking machine, and/or input recipe program via the network interface.

* * * * *